United States Patent
Tokman et al.

(10) Patent No.: US 11,816,936 B2
(45) Date of Patent: Nov. 14, 2023

(54) SYSTEM AND METHOD FOR DETECTING DRIVER TAMPERING OF VEHICLE INFORMATION SYSTEMS

(71) Applicant: Bendix Commercial Vehicle Systems LLC, Elyria, OH (US)

(72) Inventors: Andre Tokman, San Clemente, CA (US); Shaun M. Howard, Irvine, CA (US); Andreas U. Kuehnle, Villa Park, CA (US)

(73) Assignee: Bendix Commercial Vehicle Systems, LLC, Avon, OH (US)

(*) Notice: Subject to any disclaimer, the term of this patent is extended or adjusted under 35 U.S.C. 154(b) by 1015 days.

(21) Appl. No.: 16/208,400

(22) Filed: Dec. 3, 2018

(65) Prior Publication Data
US 2020/0175782 A1 Jun. 4, 2020

(51) Int. Cl.
*G07C 5/00* (2006.01)
*G07C 5/08* (2006.01)
(Continued)

(52) U.S. Cl.
CPC ............ *G07C 5/008* (2013.01); *G07C 5/085* (2013.01); *G06Q 10/06* (2013.01); *G07C 5/0816* (2013.01);
(Continued)

(58) Field of Classification Search
CPC ...... G07C 5/008; G07C 5/085; G07C 5/0816; G07C 5/0841; G06Q 10/06; G08G 1/20; H04N 7/01
See application file for complete search history.

(56) References Cited

U.S. PATENT DOCUMENTS 5,586,130 A 12/1996 Doyle
5,796,199 A 1/1998 Wilson et al.
(Continued)

FOREIGN PATENT DOCUMENTS

CN 107614802 A * 1/2018 ............ G07C 5/008
CN 110494330 A * 11/2019 ............ G07C 5/02
(Continued)

OTHER PUBLICATIONS

European Search Report issued in European application No. 19213328.8-1009 dated Apr. 7, 2020 (Eight (8) pages).
(Continued)

*Primary Examiner* — Hunter B Lonsberry
*Assistant Examiner* — Jay Khandpur
(74) *Attorney, Agent, or Firm* — Crowell & Moring LLP

(57) ABSTRACT

A fleet management server is configured to receive, via a wireless transceiver, driver and vehicle information from a plurality of vehicles relating to a plurality of drivers. The server computes, based on the received driver and vehicle information, occurrence rates for predetermined vehicle events and predetermined vehicle error codes that are associated with possible vehicle tampering, and then compares, based on the received driver and vehicle information, an occurrence rate for the predetermined vehicle events and predetermined vehicle error codes of a first driver to occurrence rates for the predetermined vehicle events and predetermined vehicle error codes of one or more of the other plurality of drivers. The server is further configured to determine, based on a result of said comparing, a tampering indicator for the first driver, and to output, to a user of the fleet management server, a confidence level that the first driver has tampered with at least one information component of at least one vehicle of the plurality of vehicles based at least in part on the tampering indicator.

20 Claims, 22 Drawing Sheets

(51) Int. Cl.
    *G06Q 10/06*     (2023.01)
    *H04N 7/01*     (2006.01)
    *G08G 1/00*     (2006.01)

(52) U.S. Cl.
    CPC .......... *G07C 5/0841* (2013.01); *G08G 1/20* (2013.01); *H04N 7/01* (2013.01)

(56) References Cited

U.S. PATENT DOCUMENTS

| | | | |
|---|---|---|---|
| 5,815,584 A * | 9/1998 | Whitecar | G01R 31/50 381/86 |
| 6,573,827 B1 | 6/2003 | McKenzie | |
| 6,718,239 B2 | 4/2004 | Rayner | |
| 6,828,692 B2 | 12/2004 | Simon | |
| 6,844,829 B2 | 1/2005 | Mayor | |
| 7,215,241 B2 | 5/2007 | Ghazarian | |
| 7,388,465 B2 | 6/2008 | Simon | |
| 7,894,378 B2 | 2/2011 | Kurnik et al. | |
| 9,020,658 B2 | 4/2015 | Karl et al. | |
| 9,669,891 B2 | 6/2017 | Utter et al. | |
| 10,296,977 B2 * | 5/2019 | Chevrette | G06Q 40/08 |
| 10,679,157 B2 * | 6/2020 | Mitchell | G06Q 10/06 |
| 2003/0036836 A1 | 2/2003 | Miller | |
| 2005/0068162 A1 | 3/2005 | Santa Cruz et al. | |
| 2006/0229780 A1 * | 10/2006 | Underdahl | B60R 25/00 701/29.3 |
| 2008/0147266 A1 * | 6/2008 | Plante | G07C 5/008 701/33.4 |
| 2017/0109827 A1 | 4/2017 | Huang et al. | |
| 2019/0221051 A1 * | 7/2019 | Jiang | G07C 5/008 |

FOREIGN PATENT DOCUMENTS

| | | | | |
|---|---|---|---|---|
| JP | 2008-181410 A | 8/2008 | | |
| WO | WO 2013/012926 A1 | 1/2013 | | |
| WO | WO-2013012926 A1 * | 1/2013 | .............. | H04N 7/01 |
| WO | WO 2018/055589 A1 | 3/2018 | | |

OTHER PUBLICATIONS

Mexican-language Mexican Office Action issued in Mexican application No. MX/a/2019/0141160 dated Feb. 28, 2020 (Two (2) pages).
English-language European Office Action issued in European application No. 19 213 328.8-1009 dated Oct. 22, 2021 (Three (3) pages).
Spanish-language Mexican Office Action issued in Mexican application No. MX/a/2019/014160 dated Jun. 1, 2023 (Four (4) pages).

* cited by examiner

400

410 SELECT GLOBAL DATASET

420 FILTER OUT DRIVERS/VEHICLES WITH SPARSE DATA

430 COMPUTE DTC & EVENT RATES

440 IDENTIFY DRIVERS WITH DTC/EVENT RELEVANT TO TAMPERING

450 COMPARE DRIVER TO OTHERS

460 IDENTIFY OVERLAPPING TAMPERING INDICATORS

FIG. 4

| FIG. 8A |
| FIG. 8B |

SYSTEM AND METHOD FOR DETECTING DRIVER TAMPERING OF VEHICLE INFORMATION SYSTEMS

FIELD OF THE INVENTION

The invention relates to detecting tampering of vehicle systems by divers and, in particular, to establishing a confidence level that a driver has tampered with at least one information component of a vehicle based at least in part on the driver exhibiting a tampering indicator.

BACKGROUND

On-vehicle systems which collect driver-related and driving-related data, including video, and which provide warnings to drivers of potentially dangerous or undesirable behavior, are susceptible to tampering. For example, some drivers may find the act of being monitored to be intrusive, or for audible and visual warnings to be annoying or otherwise unwelcomed. As a result, such drivers may engage in various efforts to circumvent such monitoring systems. Additionally, these efforts may be temporary, and done on an as needed basis, hiding the driver's poor performance on selected, more difficult, road sections or only at certain times. It is desired to identify tampering, even in the presence of apparently normal, majority, behavior.

Tampering may come in many forms, include blocking or dulling sensors (e.g. covering the radar, putting Vaseline™ over a camera sensor, etc.), disconnecting a sensor (e.g., by cutting wires or unplugging it), disconnecting and then later reconnecting a sensor—thus preventing data collection while the sensor is disconnected, forcing a sensor into a fixed state such as by jamming a switch. Additional forms of possible tampering include starting vehicle information system with a willfully deviant value, thereby forcing an error, shorting or disconnecting wires to speakers that issue warnings, etc.

Complicating the situation is that such detected errors may have a human explanation (e.g., tampering) or may arise from actual vehicle defects or naturally occurring phenomena (e.g., fog on a camera lens). For example, an ultrasonic sensor may be naturally iced over in cold weather, or may be tampered with using tape or some other material to cover the sensor. Similarly, a switch to temporarily disable a warning system may short out (thereby being continuously on) because of a real manufacturing or installation defect, or the driver may jam the switch mechanism to produce the same result.

Differentiating between sensor/warning system failures caused by tampering, on the one hand, and naturally occurring factors, on the other hand, has heretofore not been possible.

Therefore, there is a need to reliably separate unnatural, driver-caused, vehicle conditions from naturally occurring ones.

SUMMARY OF THE INVENTION

In one embodiment of the invention, a fleet management server is configured to receive, via a wireless transceiver, driver and vehicle information from a plurality of vehicles relating to a plurality of drivers. The server computes, based on the received driver and vehicle information, occurrence rates for predetermined vehicle events and predetermined vehicle error codes that are associated with possible vehicle tampering, and then compares, based on the received driver and vehicle information, an occurrence rate for the predetermined vehicle events and predetermined vehicle error codes of a first driver to occurrence rates for the predetermined vehicle events and predetermined vehicle error codes of one or more of the other plurality of drivers. The server is further configured to determine, based on a result of said comparing, a tampering indicator for the first driver, and to output, to a user of the fleet management server, a confidence level that the first driver has tampered with at least one information component of at least one vehicle of the plurality of vehicles based at least in part on the tampering indicator.

The invention further includes a method carried out by such a fleet management server.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 4 is one embodiment of a general process for carrying out one or more aspects of the invention.

DESCRIPTION OF EXEMPLARY EMBODIMENTS OF THE INVENTION

Figure 1:
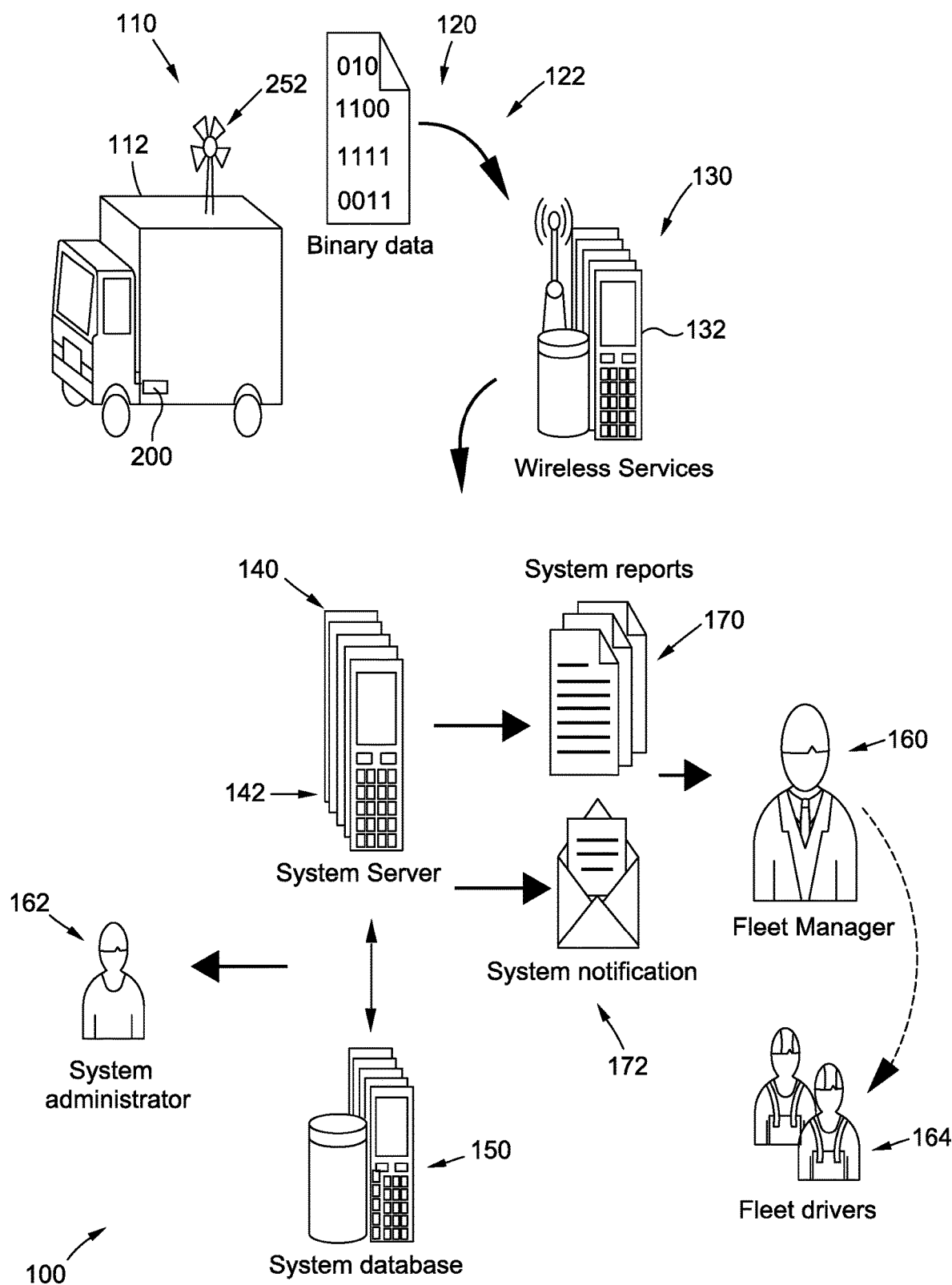
FIG. 1 is a diagram of an overview of a fleet management system configured in accordance with the principles of the invention.

In the following description of the present invention reference is made to the accompanying figures which form a part thereof, and in which is shown, by way of illustration, exemplary embodiments illustrating the principles of the present invention and how it may be practiced. Other embodiments can be utilized to practice the present invention and structural and functional changes can be made thereto without departing from the scope of the present invention.

An event detection and reporting system of the present disclosure may be configured to collect and generate data, including video and non-video event-based data, corresponding to a detected driving or vehicle event that occurred at a particular point in time during a driving excursion. Such event-based data can include data collected from components of, or components interacting with, the event detection and reporting system.

These components can detect, in real time, driving or vehicle-related events that happen over the course of a driving excursion. The components can report such events to the event detection and reporting system. Examples of events that may be reported to/collected by the event detection and reporting system in real time include, for example and without limitation, excessive acceleration, excessive braking, exceeding speed limit, excessive curve speed, excessive lane departure, lane change without turn signal, loss of video tracking, LDW system warning, following distance alert, forward collision warning, collision mitigation braking, etc.

Driving and/or vehicle events can also be detected through an analysis of the captured driving video and/or audio. For example, the speed limit of a segment of road can be detected by analyzing the captured vehicle video to identify speed limit signs captured in the video. Upon identifying a speed limit sign, and the speed limit indicated thereon, a speed limit (change) event may be generated. This analysis may be performed by the event detection and reporting system as the driving video is captured, or may be offloaded to remote systems.

In accordance with an embodiment, the event detection and reporting system may use data collected directly from vehicle components (e.g., devices, sensors, or systems), and data collected from an analysis of vehicle video, to generate event datasets that correspond in time with one or more detected driving events. However, if one or more of the vehicle components have been tampered with by the driver, the event detection and reporting system will not be able to properly detect events and generate event data, thereby resulting in underreporting of potentially dangerous or undesirable behavior, as well as failing to properly warn the driver of such behavior. Thus, one aspect of the disclosure relates to a system and method by which driver tampering of the event detection and reporting system can be detected and distinguished from naturally occurring system failures and other naturally occurring phenomena. Additional details are set forth below.

Referring now to the drawings, FIG. 1 illustrates an overview of a fleet management and reporting system 100 in accordance with one embodiment. In the example embodiment of the present invention, vehicles 110, such as trucks and cars, and particularly fleet vehicles 112, are configured with an event detection and reporting system 200 (see FIG. 2A) that generates actual data relating to driving and vehicle events that may be of interest to a fleet manager or other user. Such a system 200 may include for example a Lane Departure Warning (LDW) system 222 (FIG. 2A) that generates signals indicative of an actual lane departure, such as lane wandering or crossing. Additionally, secondary systems to be described in greater detail below with reference to FIG. 2A carried by the vehicles or installed in the vehicle systems, include one or more video cameras, radar, lidar, transmission, engine, tire pressure monitoring and braking systems for example may generate additional safety event data and driver behavior data. Front facing cameras, radar and lidar-based system may also be used to provide data relating to driver behavior in the context of following distance, headway time, response to speed signs, and anticipation of needed slowing.

With continued reference to FIG. 1, event data 120 may be selectively sent via communication links 122 to network servers 132 of one or more service providers 130. Communication service providers 130 may utilize servers 132 (only one shown for ease of illustration) that collect data 120 provided by the vehicles 112.

One or more servers 140 of the fleet management and reporting system 100 are configured to selectively download, receive, or otherwise retrieve data either directly from the vehicles 112 via the service providers 130 or from collection servers 132 which may be third party servers from one or more various telematics suppliers. Servers 140 are configured to initiate processing of the event data in manners to be described in greater detail below.

A web application 142 executable on the one or more servers 140 of the fleet management and reporting system 100 includes a dynamic graphical user interface for fleet managers 160 and administrators 162 to view all of the information once it is processed. The subject fleet management and reporting system 100 of the example embodiment also includes one or more databases 150 configured to selectively store all event information provided from the vehicles 112 in the fleet 110 for one or more designated time intervals, including raw and post-processed trip data.

In accordance with the example embodiment, the system administrators 162 are users who are provided with interfaces to configure and manage fleets, monitor platform performance, view alerts issued by the platform, and view driver and event data and subsequent processing logs and/or views. Fleet managers 160 may view event information for their respective fleet for internal processing. These events can arrive via user-initiated reports 170 in the web application 142 executable on the one or more servers 140, or via email or other notifications 172. Fleet managers 160 may, depending on internal policies and processes or for other reasons, also interface with individual drivers 164 regarding performance goals, corrections, reports, or coaching.

Figure 2A:
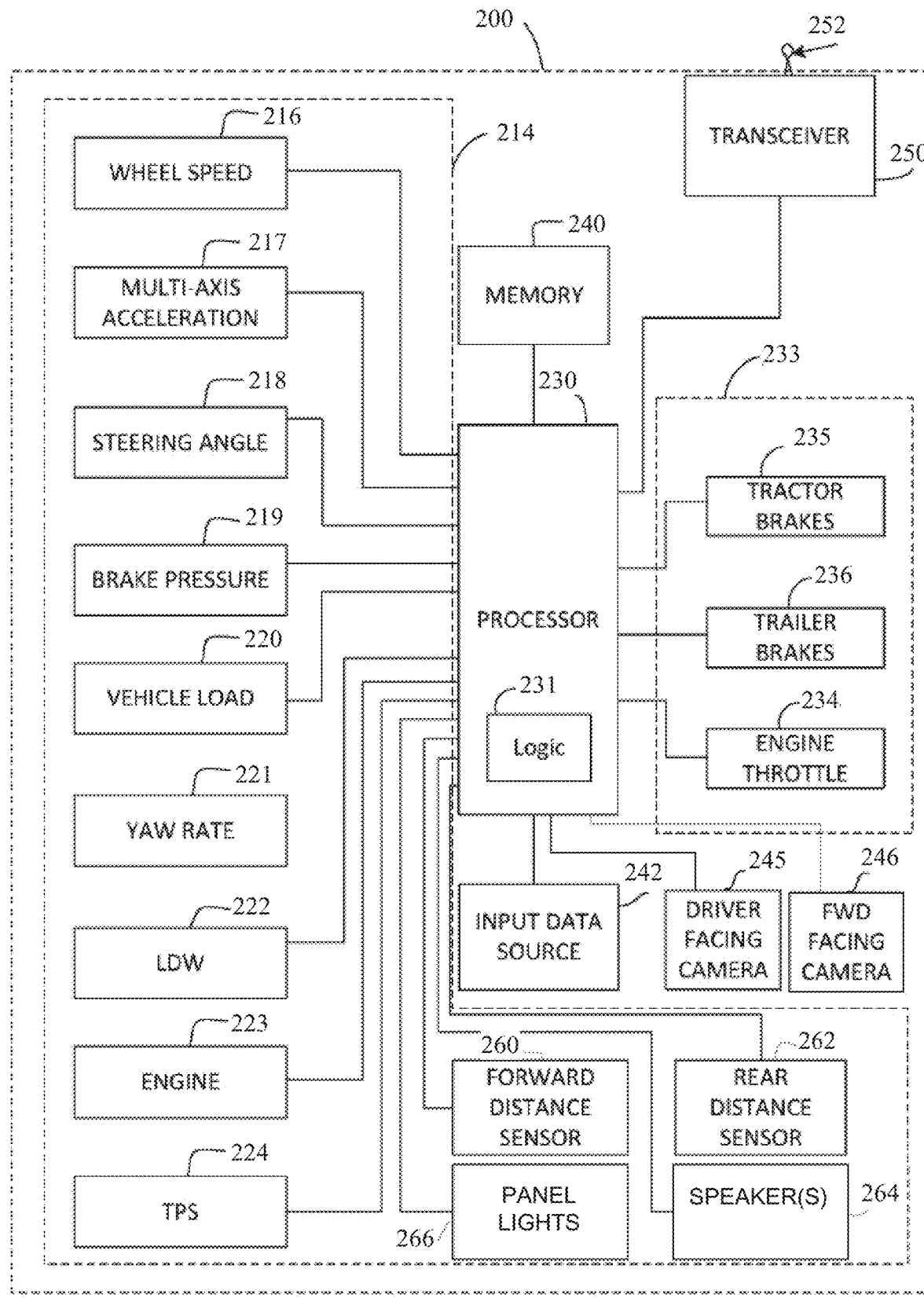
FIGS. 2A and 2B are block diagrams illustrating an embodiment of a vehicle-based computer system configured to implement one or more aspects of the invention.

Referring now to FIG. 2A, depicted is a schematic block diagram that illustrates details of an event detection and reporting system mentioned above, and which is configured to be used in accordance with one or more exemplary embodiments of the invention. As further detailed below, the in-vehicle event detection and reporting system 200 may be adapted to detect a variety of operational parameters and conditions of the vehicle and the driver's interaction therewith and, based thereon, to determine if a driving or vehicle event has occurred (e.g., if one or more operational parameter/condition thresholds has been exceeded). Data related to detected events (i.e., event data) may then be stored and/or transmitted to a remote location/server, as described in more detail below.

The event detection and reporting system 200 of FIG. 2A may include one or more devices or systems 214 for providing input data indicative of one or more operating parameters or one or more conditions of a commercial vehicle. Alternatively, the event detection and reporting system 200 may include a signal interface for receiving signals from the one or more devices or systems 214, which may be configured separate from system 200. For example, the devices 214 may be one or more sensors, such as but not limited to, one or more wheel speed sensors 216, one or more acceleration sensors such as multi-axis acceleration sensors 217, a steering angle sensor 218, a brake pressure sensor 219, one or more vehicle load sensors 220, a yaw rate sensor 221, a lane departure warning (LDW) sensor or system 222, one or more engine speed or condition sensors 223, and a tire pressure (TPMS) monitoring system 224. The event detection and reporting system 200 may also utilize additional devices or sensors in the exemplary embodiment including for example a forward distance sensor 260 and a rear distance sensor 262 (e.g., radar, lidar, etc.). Other sensors and/or actuators or power generation devices or combinations thereof may be used of otherwise provided as well, and one or more devices or sensors may be combined into a single unit as may be necessary and/or desired.

The event detection and reporting system 200 may also include instrument panel lights 266 and speaker(s) 264, which may be usable to provide headway time/safe following distance warnings, lane departure warnings, and warnings relating to braking and or obstacle avoidance events.

The event detection and reporting system 200 may also include a logic applying arrangement such as a controller or processor 230 and control logic 231, in communication with the one or more devices or systems 214. The processor 230 may include one or more inputs for receiving input data from the devices or systems 214. The processor 230 may be adapted to process the input data and compare the raw or processed input data to one or more stored threshold values or desired averages, or to process the input data and compare the raw or processed input data to one or more circumstance-dependent desired value.

The processor 230 may also include one or more outputs for delivering a control signal to one or more vehicle systems 233 based on the comparison. The control signal may instruct the systems 233 to provide one or more types of driver assistance warnings (e.g., warnings relating to braking and or obstacle avoidance events) and/or to intervene in the operation of the vehicle to initiate corrective action. For example, the processor 230 may generate and send the control signal to an engine electronic control unit or an actuating device to reduce the engine throttle 234 and slow the vehicle down. Further, the processor 230 may send the control signal to one or more vehicle brake systems 235, 236 to selectively engage the brakes (e.g., a differential braking operation). A variety of corrective actions may be possible and multiple corrective actions may be initiated at the same time.

The event detection and reporting system 200 may also include a memory portion 240 for storing and accessing system information, such as for example the system control logic 231. The memory portion 240, however, may be separate from the processor 230. The sensors 214 and processor 230 may be part of a preexisting system or use components of a preexisting system.

The event detection and reporting system 200 may also include a source of input data 242 indicative of a configuration/condition of a commercial vehicle. The processor 230 may sense or estimate the configuration/condition of the vehicle based on the input data, and may select a control tuning mode or sensitivity based on the vehicle configuration/condition. The processor 230 may compare the operational data received from the sensors or systems 214 to the information provided by the tuning.

In addition, the event detection and reporting system 200 is operatively coupled with one or more driver facing imaging devices, shown in the example embodiment for simplicity and ease of illustration as a single driver facing camera 245 that is trained on the driver and/or trained on the interior of the cab of the commercial vehicle. However, it should be appreciated that one or more physical video cameras may be disposed on the vehicle such as, for example, a video camera on each corner of the vehicle, one or more cameras mounted remotely and in operative communication with the event detection and reporting system 200 such as a forward facing camera 246 to record images of the roadway ahead of the vehicle. In the example embodiments, driver data can be collected directly using the driver facing camera 245 in accordance with a detected driver head positon, hand position, or the like, within the vehicle being operated by the vehicle. In addition, driver identity can be determined based on facial recognition technology and/or body/posture template matching.

Still yet further, the event detection and reporting system 200 may also include a transmitter/receiver (transceiver) module 250 such as, for example, a radio frequency (RF) transmitter including one or more antennas 252 for wireless communication of the automated control requests, GPS data, one or more various vehicle configuration and/or condition data, or the like between the vehicles and one or more destinations such as, for example, to one or more services (not shown) having a corresponding receiver and antenna. The transmitter/receiver (transceiver) module 250 may include various functional parts of sub portions operatively coupled with a platoon control unit including for example a communication receiver portion, a global position sensor (GPS) receiver portion, and a communication transmitter. For communication of specific information and/or data, the communication receiver and transmitter portions may include one or more functional and/or operational communication interface portions as well.

The processor 230 is operative to combine selected ones of the collected signals from the sensor systems described above into processed data representative of higher level vehicle condition data such as, for example, data from the multi-axis acceleration sensors 217 may be combined with the data from the steering angle sensor 218 to determine excessive curve speed event data. Other hybrid event data relatable to the vehicle and driver of the vehicle and obtainable from combining one or more selected raw data items from the sensors includes, for example and without limitation, excessive braking event data, excessive curve speed event data, lane departure warning event data, excessive lane departure event data, lane change without turn signal event data, loss of video tracking (LOVT) event data, LDW system disabled event data, distance alert event data, forward collision warning event data, haptic warning event data, collision mitigation braking event data, ATC event data, ESP event data, RSP event data, ABS event data, TPMS event data, engine system event data, average following distance event data, average fuel consumption event data, average ACC usage event data, and late speed adaptation (such as that given by signage or exiting).

The event detection and reporting system 200 of FIG. 2A is suitable for executing embodiments of one or more software systems or modules that perform vehicle brake strategies and vehicle braking control methods according to the subject application. The example event detection and reporting system 200 may include a bus or other communication mechanism for communicating information, and a processor 230 coupled with the bus for processing information. The computer system includes a main memory 240, such as random access memory (RAM) or other dynamic storage device for storing instructions and loaded portions of the trained neural network to be executed by the processor 230, and read only memory (ROM) or other static storage device for storing other static information and instructions for the processor 230. Other storage devices may also suitably be provided for storing information and instructions as necessary or desired.

Instructions may be read into the main memory 240 from another computer-readable medium, such as another storage device of via the transceiver 250. Execution of the sequences of instructions contained in main memory 240 causes the processor 230 to perform the process steps described herein. In an alternative implementation, hard-wired circuitry may be used in place of or in combination with software instructions to implement the invention. Thus implementations of the example embodiments are not limited to any specific combination of hardware circuitry and software.

Figure 2B:
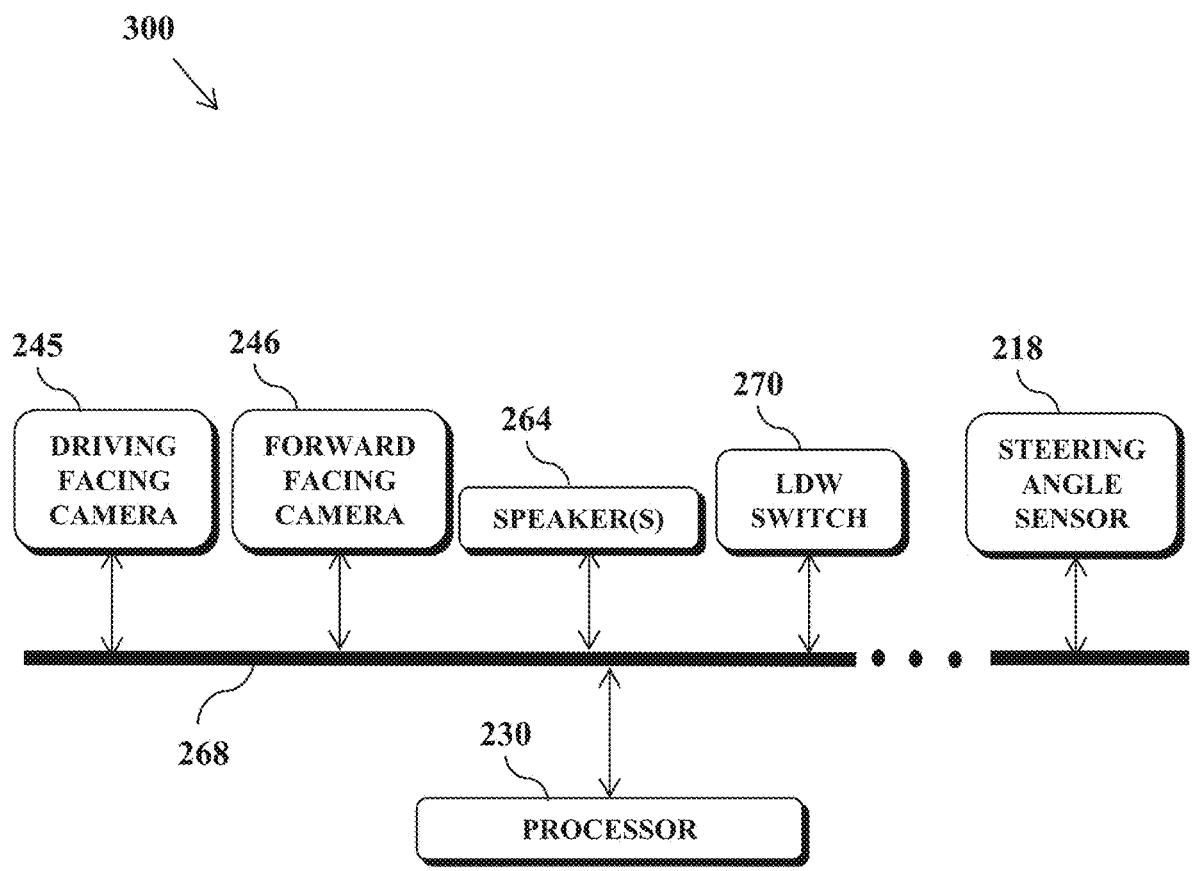

Referring now to FIG. 2B, only certain components of the event detection and reporting system 200 of FIG. 2A are depicted. As shown, various components of the system 200 are shown as being in communication with processor 230 by virtue of being connected to a vehicle bus 268, which can be a private bus dedicated to the system 200 or a general vehicle bus, or both. As shown, in addition to DFC 245, FFC 246, speaker(s) 246 and steering angle sensor 218, an LDW switch 270 is also shown as being in communication with processor 230 via bus 268. LDW switch 270 is a component provided in the interior of a vehicle by which the driver can legitimately switch off the LDW system 222 on a temporary basis. This functionality may be provided so that drivers can temporarily avoid receiving repeated unwarranted warnings due to certain unusual road conditions, such as passing through a construction area where lanes are significantly narrowed, rendering it impossible or very difficult to otherwise avoid setting off the LDW system 222.

Referring to the components of FIG. 2B by way of example only, a driver may attempt to tamper with one or more of the depicted components, as described above.
Camera Tampering For example, the DFC 245 and/or the FFC 246 may be used for speed sign detection, lane departure detection, obstacle detection and the like. A driver may be motivated to disable or impair such a camera because it is being used to generate lane departure warnings and over-speed events, where such warnings may be viewed as annoying or otherwise undesirable. The form of tampering may include unplugging the camera, cutting the wire to the camera, or blocking the camera lens with a film or substance which otherwise impairs its ability to detect events or conditions which may lead to a driver warning.

As a result of this tampering, no over-speed, LDW, or collision-mitigation events will be generated for the period of time when the camera is disabled or impaired. Moreover, various components connected to the system 200 may transmit specific faults and messages indicating their error state. The event detection and reporting system 200 may then interpret these error messages and generate one or more corresponding DTCs indicative of a disconnected camera, for example, or LOVT events may be reported in response to the camera not being able to track lane markings. In addition, the per km rates for camera-driven events, such as LDW and over-speed, will be much lower in frequency than usual, either with respect to the driver or the overall fleet. As detailed below with reference to FIG. 5, the combination of generated DTCs, LOVT events and deviations from normalized camera-driven event frequencies may be used to determine if a driver has tampered with the vehicle's cameras or camera-related components.
Speaker Tampering In another example, speakers (e.g., speaker(s) 264) are often used to provide auditory lane change warnings to drivers, as well as warnings of other critical events. In order to avoid such warnings, the driver may unplug or cut either or both of the cables running to a given speaker that provides such warnings. Alternatively, speaker cables can be shorted together which would impair the ability of the event detection and reporting system 200 to provide LDWs and other types of warnings in an auditory fashion.

As a result of this tampering, the event detection and reporting system 200 may then generate a specific diagnostic trouble code (DTC) indicative of an open or shorted speaker. In addition, the per km rate for LDW-driven events will be much lower in frequency than usual, either with respect to the driver or the overall fleet. As detailed below with reference to FIGS. 7A-7B, the combination of generated DTCs and deviations from normalized LDW-driven events frequencies may be used to determine if a driver has tampered with the vehicle's speakers.
LDW Disable Switch Tampering In another example, some vehicles are equipped with an LDW disable switch 270, which allows the driver to legitimately switch off the LDW system 222 on a temporary basis under difficult driving conditions in which it is not possible or very difficult to avoid LDW events, such as when driving on narrowed lanes in constructions zones. Rather than only using the switch in appropriate situations, drivers may attempt to jam the switch into the "LDW Off" position for an extended period of time or even for the entire trip in order to avoid all lane departure warnings.

As a result of this tampering, the event detection and reporting system 200 may then generate a specific diagnostic trouble code (DTC) indicative of the fact that the system 200 has been placed in a fault mode. This may result by detecting the switch has been depressed/jammed for more than some period of time (e.g., 7 seconds). In addition, the per km rates for LDW-driven events will be much lower in frequency than usual, either with respect to the driver or the overall fleet. As detailed below with reference to FIGS. 9A-9B (hereinafter "FIG. 9"), the combination of generated DTCs and deviations from normalized LDW-driven events frequencies may be used to determine if a driver has willfully tampered with the vehicle's LDW disable switch.
Steering Angle Sensor Tampering In still another example, the event detection and reporting system 200 may rely on a steering angle sensor, at least in part, to determine when roll stability program (RSP) or electronic stability program (ESP) events occur. However, it is possible for the driver to disconnect or disable the sensor.

As a result of this tampering, various components connected to the system 200 may transmit specific faults and messages indicating their error state. The event detection and reporting system 200 may then interpret these error messages and generate one or more corresponding DTCs indicative of the fact that steering angle sensor is no longer detected or properly reporting values to the system 200. In addition, ESP and RSP events will stop occurring when they should. The process of detecting and processing steering angle sensor tampering is set forth in more detail below with reference to FIGS. 8A-8B.
Radar or Lidar Tampering In still another example, the event detection and reporting system 200 may rely on lidar- or radar-based systems (e.g., sensors 260/262) to information relating to following distance, headway time, response to speed signs, and anticipation of needed slowing. When any thresholds relating to these parameters are exceeded, the event detection and reporting system 200 may provide warnings. As with the other types of warning noted above, these warnings may be annoying or otherwise undesirable to the driver. As such, a driver may disconnect, reorient, or cover the radar sensor.

As a result of this tampering, various components connected to the system 200 may transmit specific faults and messages indicating their error state. The event detection and reporting system 200 may then interpret these error messages and generate one or more corresponding DTCs indicative of an apparent sensor failure. In addition, the per km rates for distance-related events will be much lower in frequency than usual, either with respect to the driver or the overall fleet. As detailed below in FIGS. 10A-10B, the combination of generated DTCs and deviations from normalized distance-related event frequencies may be used to determine if a driver has tampered with the vehicle's speakers.

Data Analysis.

As noted above, most types of tampering generate DTC codes. However, such codes by themselves are insufficient to distinguish tampering from a naturally occurring condition. As such, one aspect of the invention is to provide a multi-faceted approach to analyzing data relevant to potential tampering. For example, in addition to DTC codes, tampering tends to prevent or reduce the detection of undesirable driver or vehicle behavior. As such, the measured frequency of undesirable driver behavior will tend to be abnormally low compared with either the driver's own prior behavior, or with the overall fleet's usual driver behavior. Thus, abnormally large, too good to be true, deviations from an average or usual value is a further indication of possible tampering. However, one aspect of the invention is to recognize that establishing a sufficient confidence level that tampering has occurred requires consideration of multiple data sources and particularly overlapping tampering indicators, as now described with reference to FIG. 3.

Figure 3:
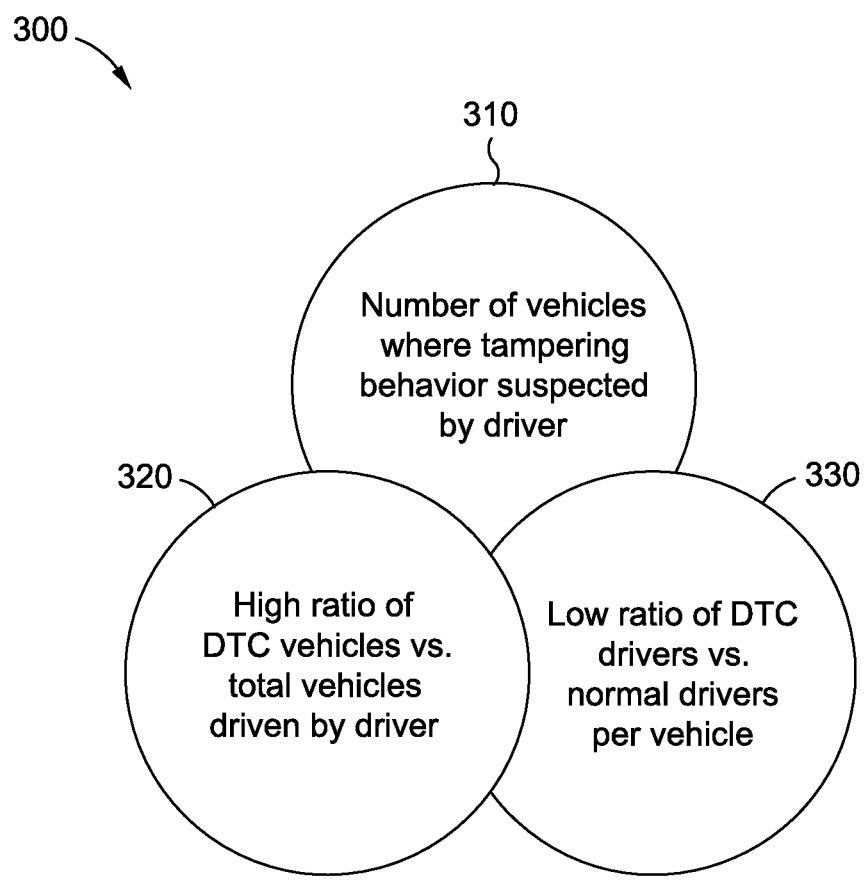
FIG. 3 depicts a graphical representation of how data can be used to increase tampering analysis confidence.

Referring now to FIG. 3, depicted is a Venn diagram 300 showing how driver and vehicle data from a fleet can be analyzed to increase tampering analysis confidence. Membership in any of the datasets 310, 320 or 330 is considered a "tampering indicator." Specifically, dataset 310 represents the total number of vehicles across the fleet in which driver tampering is suspected. This data may relate to those drivers and/or vehicles for which tamper-related DTCs have been triggered, as described above with reference to the various tamper-prone components. This data may also relate to driver behavior that falls outside a normal distribution of behavior, such as by having unusually low lane departures, braking events, etc.

Dataset 320 represents, for a given driver, the ratio of the number of vehicles that experienced a tamper-related DTC during a given time to the total number of vehicles driven by the driver in question. When this ratio is high, it means that an unusually large number of the vehicles driven by the driver experience a DTC. Finally, dataset 330 represents, for a given vehicle, a ratio of the number of drivers who experience a tamper-related DTC to the number of drivers who do not experience a tamper-related DTC in that vehicle within the given time frame.

At any of the overlapping portions of datasets 310, 320 and 330, the degree of confidence that a tamper event has occurred increases significantly. At the center overlapping portion of all three datasets, the degree of confidence that a tamper event has occurred is very high.

With the above tampering indicators in mind, FIG. 4 illustrates a generic embodiment of how the tampering indicators of FIG. 3 can be generated and how confidence that tampering has occurred can be established using the tampering indicators. Specifically, process 400 begins at block 410 with the selection of a global dataset, for example all vehicle and driver data collected for the last X weeks or months.

From there, any drivers or vehicles having less than some minimum amount of data (e.g., less than 100 km traveled for selected timeframe) are filtered out (block 420). In addition, other data can be filtered out based on likely system failure (e.g., if first occurrence of an LDW switch event and a switch failure event occurred within one minute of the beginning of a trip, a faulty setup can be assumed). At block 430, for each driver the process then computes per kilometer rates for selected types of DTCs and events which are relevant to the issue of driver tampering. Per kilometer rates of DTCs/events may also be computed, for a given driver, across all of the vehicles driven by that driver so as to be able to generate a vehicle average across the entire fleet and/or individually for each vehicle driven by the driver.

Process 400 continues at block 440 where all drivers with at least one DTC/event that is relevant to tampering are identified. The variously-computed per km rates for each identified driver can then be compared against the corresponding per km rates of the other fleet drivers at block 450. Based on this comparison, all drivers which exhibit a tampering indicator (i.e., membership within one or more of the datasets 310-330) are identified at block 460, with drivers exhibiting overlapping tampering indicators being identified as having a higher confidence that tampering has occurred.

It should be appreciated that, in order to later compare per kilometer rate data, a normalized rate may be created. In addition, percentiles for LDWs, switch failures and manually triggered events may be created. These values may be combined to provide an initial confidence percentage that a driver may be tampering, such as by the following equation:

$$([PercentLDW]+[PercentSW]+[PercentMT])/3,$$

where PercentLDW is the inverse of the driver's percentile placement in the fleet distribution for LDW rates (1-LDWpercentile), where PercentSW is the driver's percentile in the fleet distribution for switch failure DTC rates, and where PercentMT is the driver's percentile in the fleet distribution for manual trigger event rates.

The value produced using the above equation is an average of the aforementioned driver-fleet comparison factors which generate an LDW disable switch tampering confidence percentage.

Separately, the drivers below a certain percentile (e.g., $10^{th}$ percentile) may be initially flagged for potential tampering. As described in more detail below, the vehicle that the driver has driven may be analyzed, as well as whoever else drove that vehicle. This cross-validation can be used to further increase a tampering confidence level.

Figure 5:
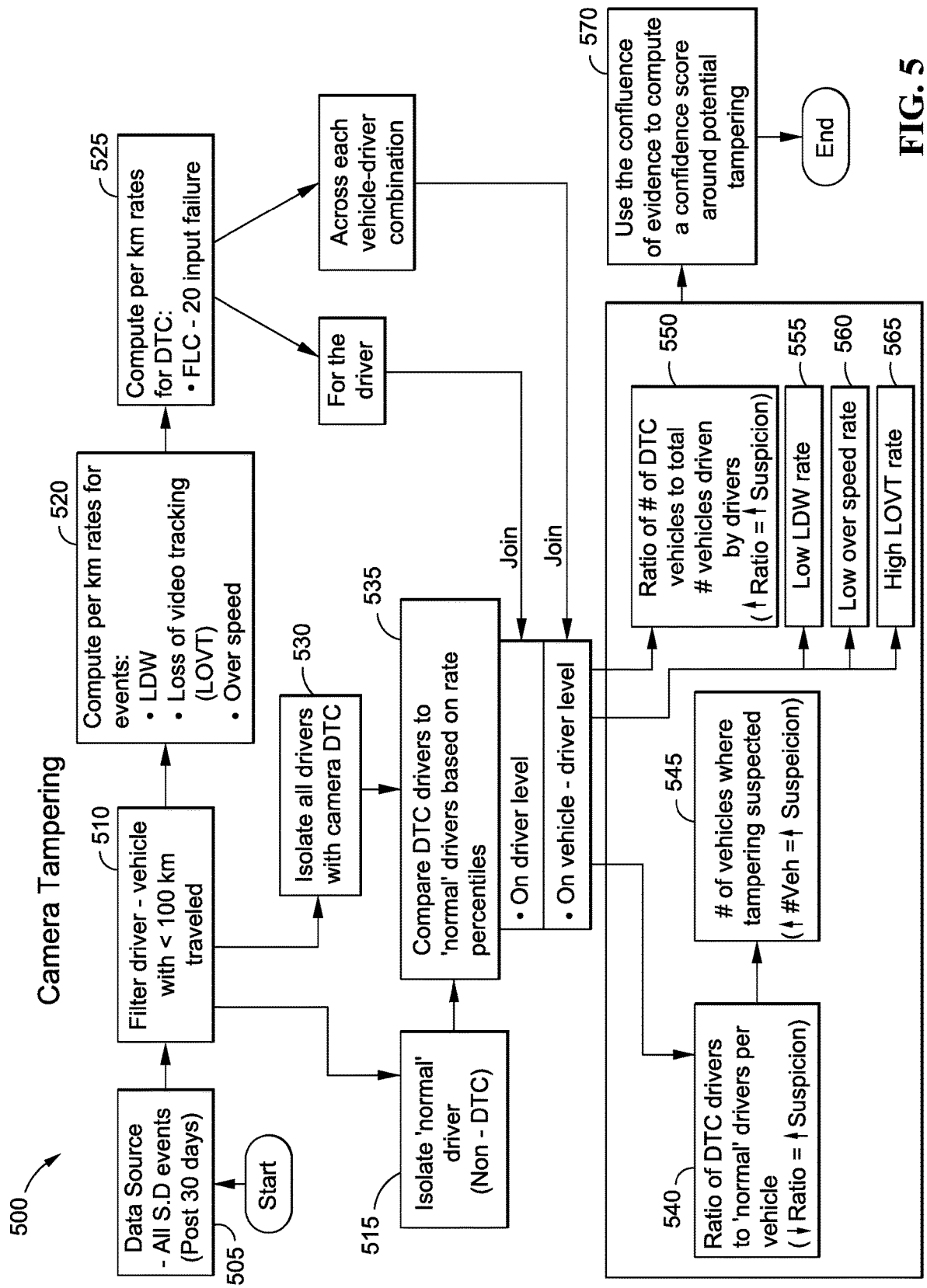
FIG. 5 is one embodiment of a process for carrying out one or more aspects of the invention in the context of possible camera tampering.
Figure 6:
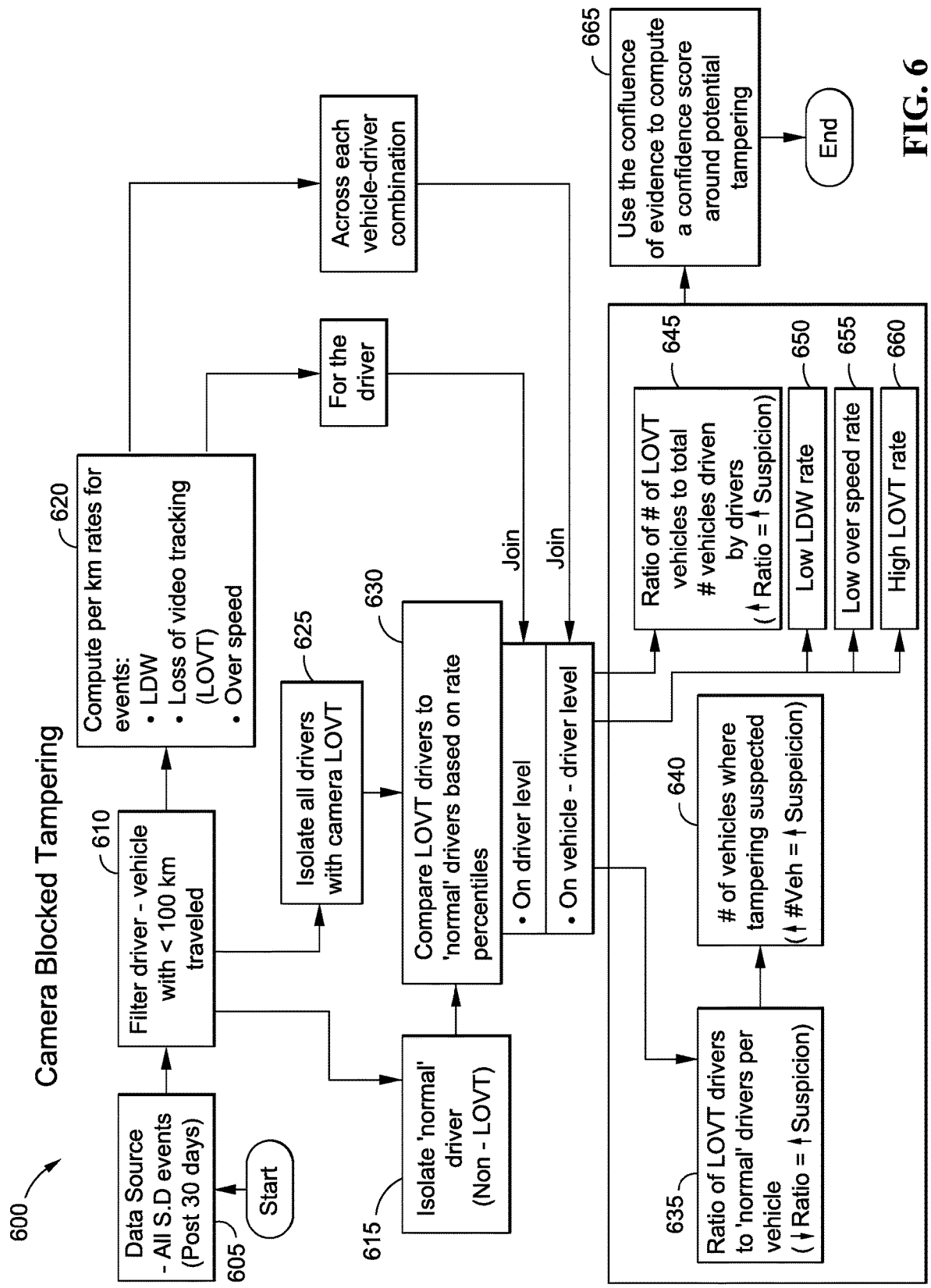
FIG. 6 is another embodiment of a process for carrying out one or more aspects of the invention also in the context of possible camera tampering.

As noted above, a driver may be motivated to disable or impair a camera because it is being used to generate lane departure warnings and over-speed events, where such warnings may be viewed as annoying or otherwise undesirable. The form of tampering may include unplugging the camera, cutting the wire to the camera, or blocking the camera lens with a film or substance which otherwise impairs its ability to detect events or conditions which may lead to a driver warning. Thus, while process 400 of FIG. 4 illustrates a generic embodiment of how tampering can be detected and processed, FIGS. 5 and 6 illustrate certain embodiment of how camera tampering, in particular, may be detected and processed, in accordance with the principles of the invention.

Specifically, process 500 relates to camera tampering by way of disconnection and begins at block 505 with selection of a global dataset, for example all vehicle and driver data collected for the last 30 days, for example. From there, any drivers or vehicles having less than some minimum amount of data (e.g., less than 100 km traveled for selected timeframe) are filtered out (Mock 510). In addition, drivers who have not experienced any camera-related DTCs during the selected timeframe are also filtered out at block 515.

From there, at block 520 per kilometer rates for events may be computed for LDW, loss of video tracking and over speed, while per kilometer rates for camera-related DTCs are computed at block 525. For example, one may have 0.12 LDW events per mile and 0.002 DTCs per mile.

Based on the remaining drivers after the filtering operations of blocks 510 and 515, all drivers with at least one camera-related DTC may be isolated at block 530. Those 'DTC drivers' may then be compared to the non-DTC drivers of block 515 based on rate percentiles (block 535). It should be appreciated that the per kilometer rates for events from block 520 and the per kilometer rates for DTCs from block 525 may be used to provide rate percentiles on either a driver level or a vehicle-driver level, as shown in FIG. 5.

From there process 500 continues to block 540 where the ratio of DTC drivers to non-DTC drivers per vehicle is computed (corresponds to dataset 330 of FIG. 3). At block 545 the number of vehicles where tampering behavior is suspected is also computed (corresponds to dataset 310 of FIG. 3), and the ratio of the number of vehicles experiencing DTCs to the number of vehicles driven by the driver is computed at block 550 (corresponds to dataset 320 of FIG. 3).

In addition, a low LDW rate 555, low over speed 560 and/or a high loss of video tracking rate 565 are all indicators of potential camera tampering. Thus, each of the values corresponding to blocks 540-565 may then be used to compute a confidence score corresponding to a potential camera tampering at block 570.

Referring now to FIG. 6, process 600 relates to camera tampering by way of blocking or otherwise obscuring the view of the camera sensor. Like the process 500 of FIG. 5, process 600 similarly begins with the selection of a global dataset, for example all vehicle and driver data collected for the last 30 days, for example, at block 605. From there, any drivers or vehicles having less than some minimum amount of data (e.g., less than 100 km traveled for selected timeframe) are filtered out (block 610). In addition, drivers who have not experienced any LOVT events during the selected timeframe are also filtered out at block 615.

From there, per kilometer rates for events may be computed for LDW, loss of video tracking and over speed at block 520.

Based on the remaining drivers after the filtering operations of blocks 610 and 615, all drivers with at least one LOVT event may be isolated at block 625. Those 'LOVT drivers' may then be compared to the non-LOVT drivers of block 615 based on rate percentiles (block 630). It should be appreciated that the per kilometer rates for events from block 620 may be used to provide rate percentiles on either a driver level or a vehicle-driver level, as shown in FIG. 6.

From there process 600 continues to block 635 where the ratio of LOVT drivers to non-LOVT drivers per vehicle is computed. At block 640 the number of vehicles where tampering behavior is suspected is also computed, and the ratio of the number of vehicles experiencing LOVT events to the number of vehicles driven by the driver is computed at block 645.

In addition, a low LDW rate 650, low over speed 655 and/or a high LOVT 660 are all indicators of potential camera tampering. Thus, each of the values corresponding to blocks 635-660 may then be used to compute a confidence score corresponding to a potential camera tampering at block 665.

Figure 7A:
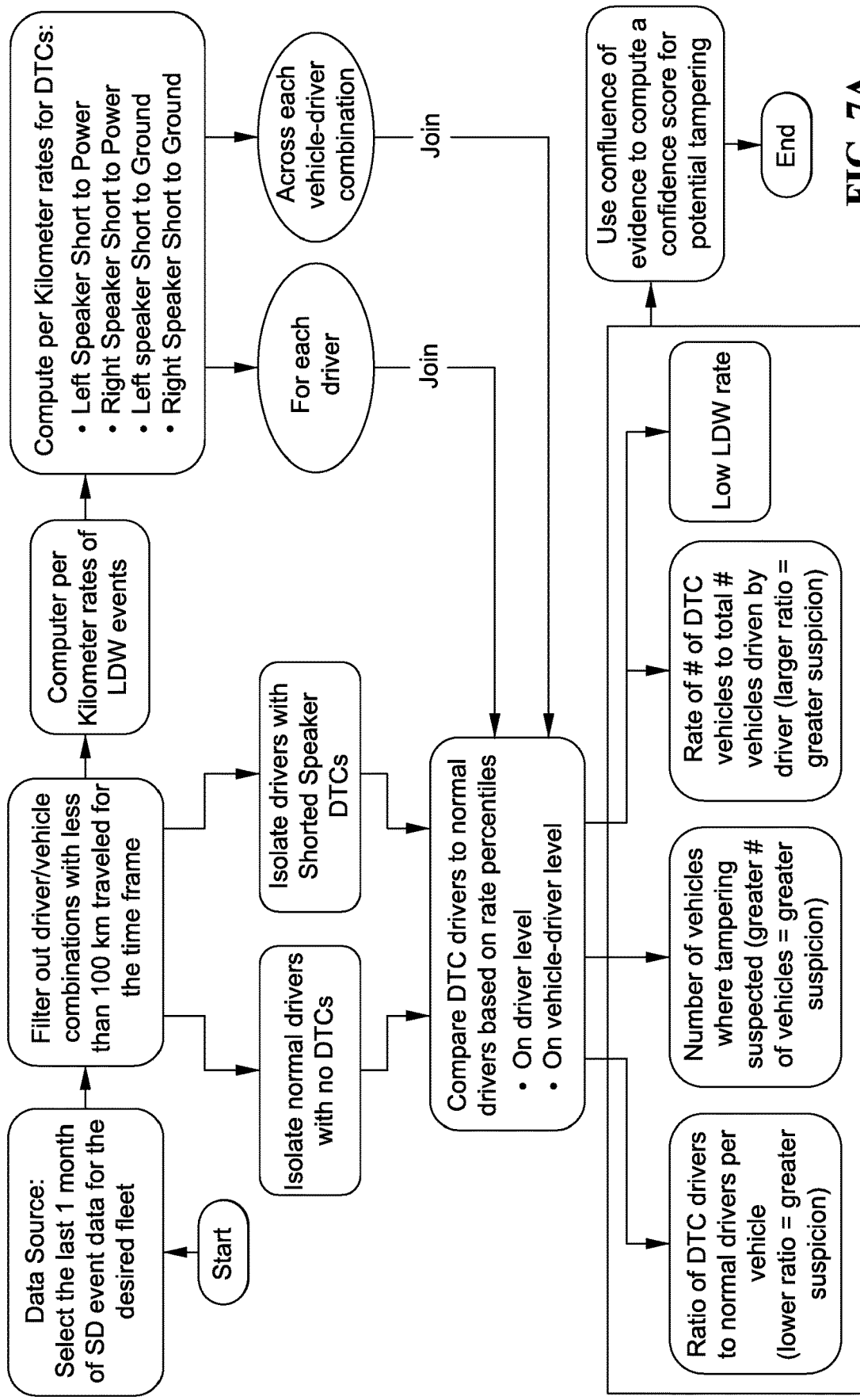
FIGS. 7A-7B illustrate processes for carrying out one or more aspects of the invention in the context of possible speaker tampering.
Figure 7B:
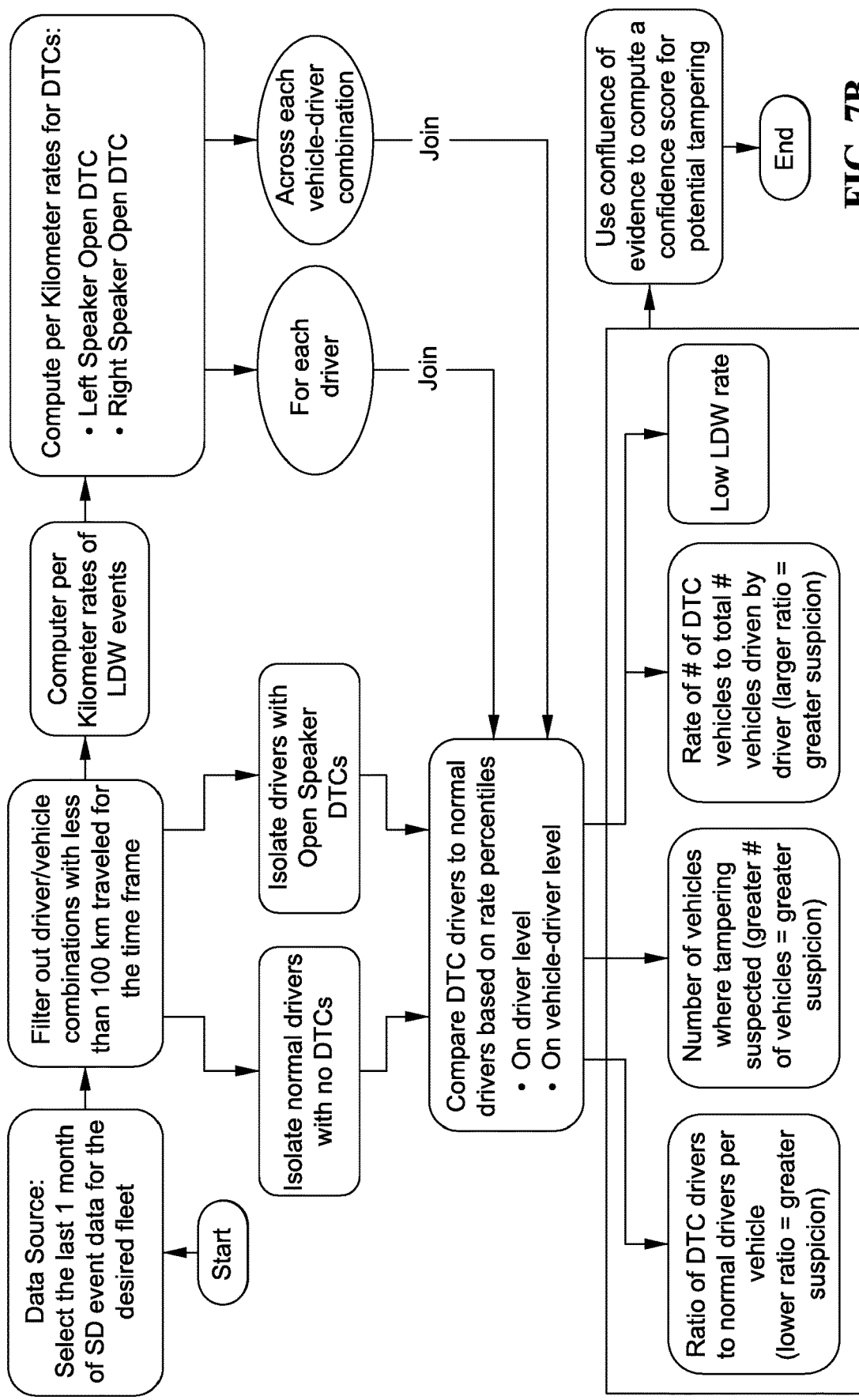

Referring now to FIGS. 7A-7B, depicted are processes similar to the processes of FIGS. 5 and 6, but in this case correspond to detecting and processing potential speaker tampering in the form of a shorted speaker (FIG. 7A) or in the form of an open speaker (FIG. 7B).

Figures 8, 8A:
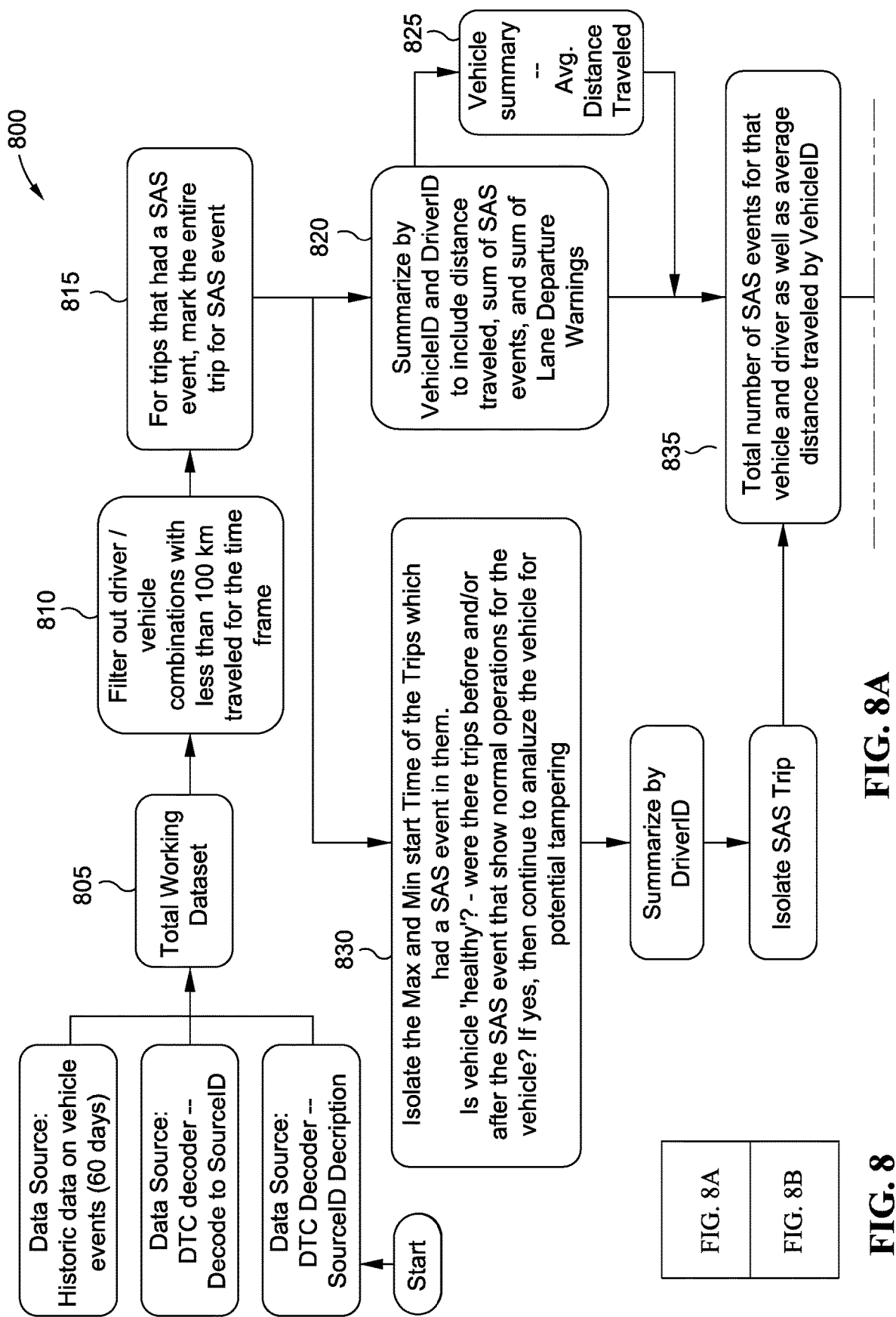
FIGS. 8 and 8A-8B is an embodiment of a process for carrying out one or more aspects of the invention in the context of possible steering angle sensor tampering.
Figure 8B:
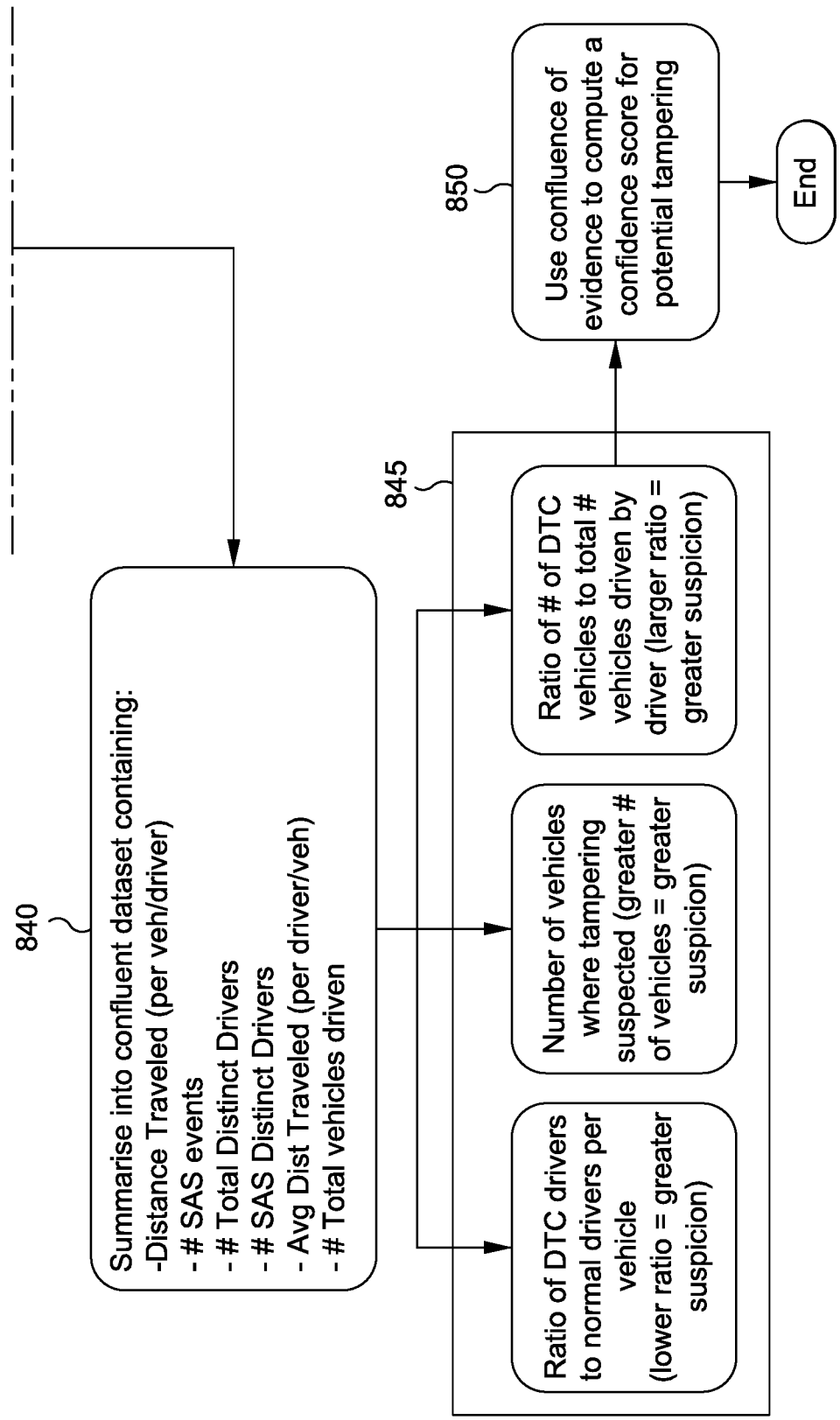

Referring now to FIGS. 8A-8B (hereinafter "FIG. 8"), depicted is a process that is also similar to the processes of FIGS. 5, 6 and 7A-7B, but in this case corresponds to detecting and processing potential tampering of the steering angle sensor (SAS).

In particular, process 800 similarly begins with the selection of a global dataset at block 805. From there, any drivers or vehicles having less than some minimum amount of data (e.g., less than 100 km traveled for selected timeframe) are filtered out (block 810).

From there, for any trip that reported an SAS event, the entire trip may be marked for SAS events at block 815. The results may then be summarized according to vehicle and driver identification numbers at 820, with vehicle summary data also generated at block 825, such as the average distance traveled. The maximum and minimum start time of any SAS trips may be isolated at block 830 to help determine if there is a mechanical issue with the vehicle. After then further summarizing the information by driver ID and isolating SAS trips for which no obvious mechanical issue exists, a total number of SAS events for that vehicle and driver, as well as the average distance traveled by the vehicle may be computed at block 835.

Continuing to refer to FIG. 8, process 800 may then continue to block 840 where the resulting data is organized into confluent datasets. From there the process 800 proceeds to block 845 to calculate the various tampering indicator values first described above with reference to FIG. 3 and then also with reference to the operations in blocks 540-550 of FIG. 5. Finally, the variously-computed tampering indicators may then be used at block 850 to compute a confidence score corresponding to a potential steering angle sensor tampering.

Figures 9, 9A:
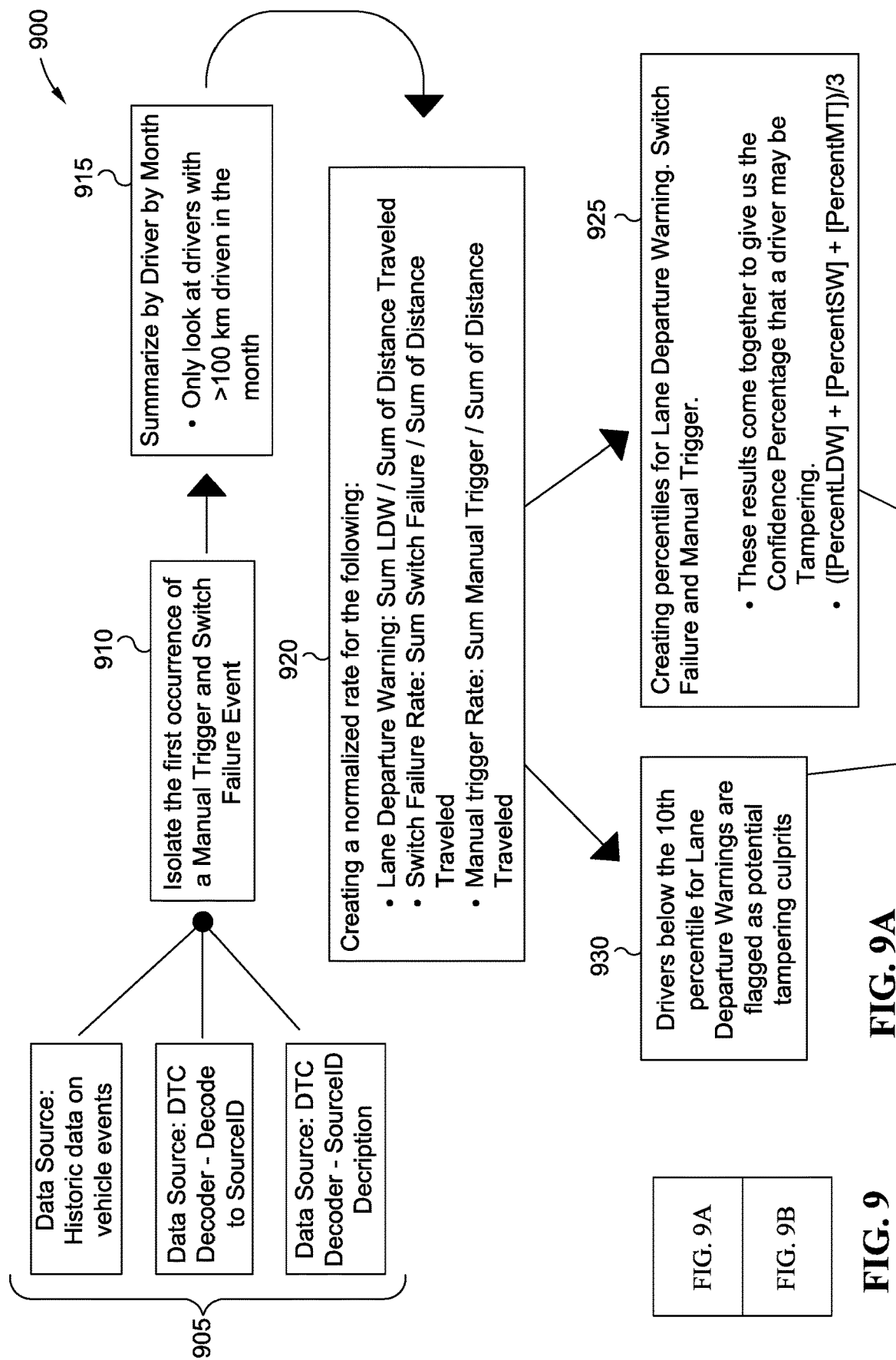
FIGS. 9 and 9A-9B is an embodiment of a process for carrying out one or more aspects of the invention in the context of possible lane departure warning switch tampering.
Figure 9B:
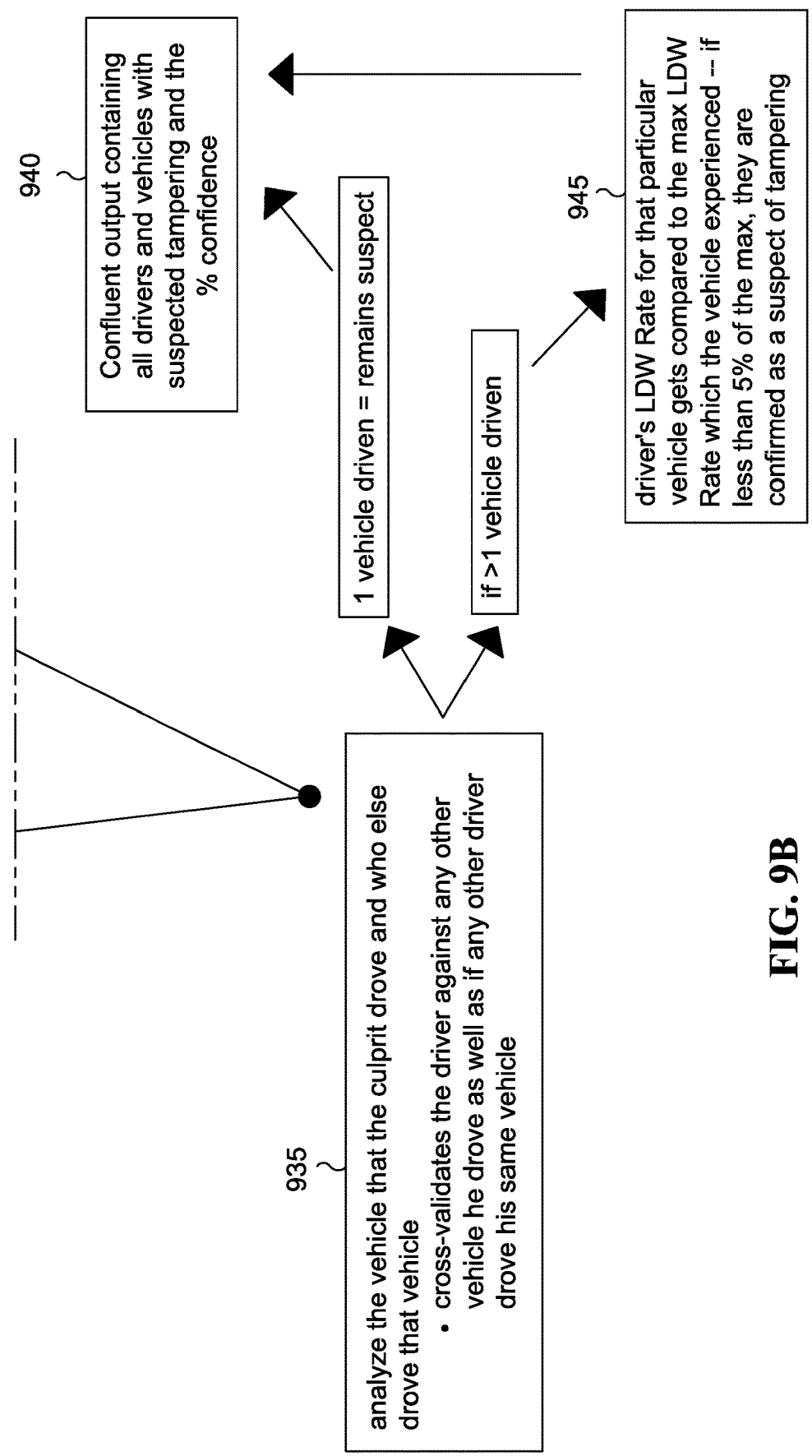

Referring now to FIG. 9, depicted is a process 900 for LDW switch tampering detection, which begins once again with the selection of a global dataset at block 905. The first occurrence of a manual LDW switch trigger and switch failure event for a given vehicle is isolated at block 910. From there, the data may be summarized by driver, while filtering out those drivers who have driven less than some minimum amount (block 915).

Then, at block 920 a normalized rate may be generated for each of LDWs, switch failure rates and manual trigger rates. Based on the normalized data, percentiles may be created at block 925 with the results being combined to provide a confidence percentage that a given driver is tampering, such as using the equation mentioned above to compute an initial confidence percentage. Drivers below the 10th percentile for LDWs may be flagged as potential tampering culprits at block 930.

Continuing to refer to FIG. 9, process 900 may then continue to block 935 where the vehicle(s) driven by the suspected driver are analyzed with respect to other drivers of the same vehicle(s) in order to cross-validate the suspected driver against other vehicle(s) driven by the suspected driver or also with respect to other drivers of the same vehicle. If there is only a single vehicle driven by the suspected driver, the driver will remain a suspect and a confluent output will be generated and output at block 940, which contains all drivers and vehicles with suspected tampering, along with a confidence percentage.

If, on the other hand, there is more than one vehicle, the driver's LDW Rate for that particular vehicle may be compared to the max LDW Rate which the vehicle has experienced overall (block 945). If the result is less than 5% of the max LDW rate, the driver is confirmed as a suspect of tampering and the process proceeds to block 940 described above.

Figure 10A:
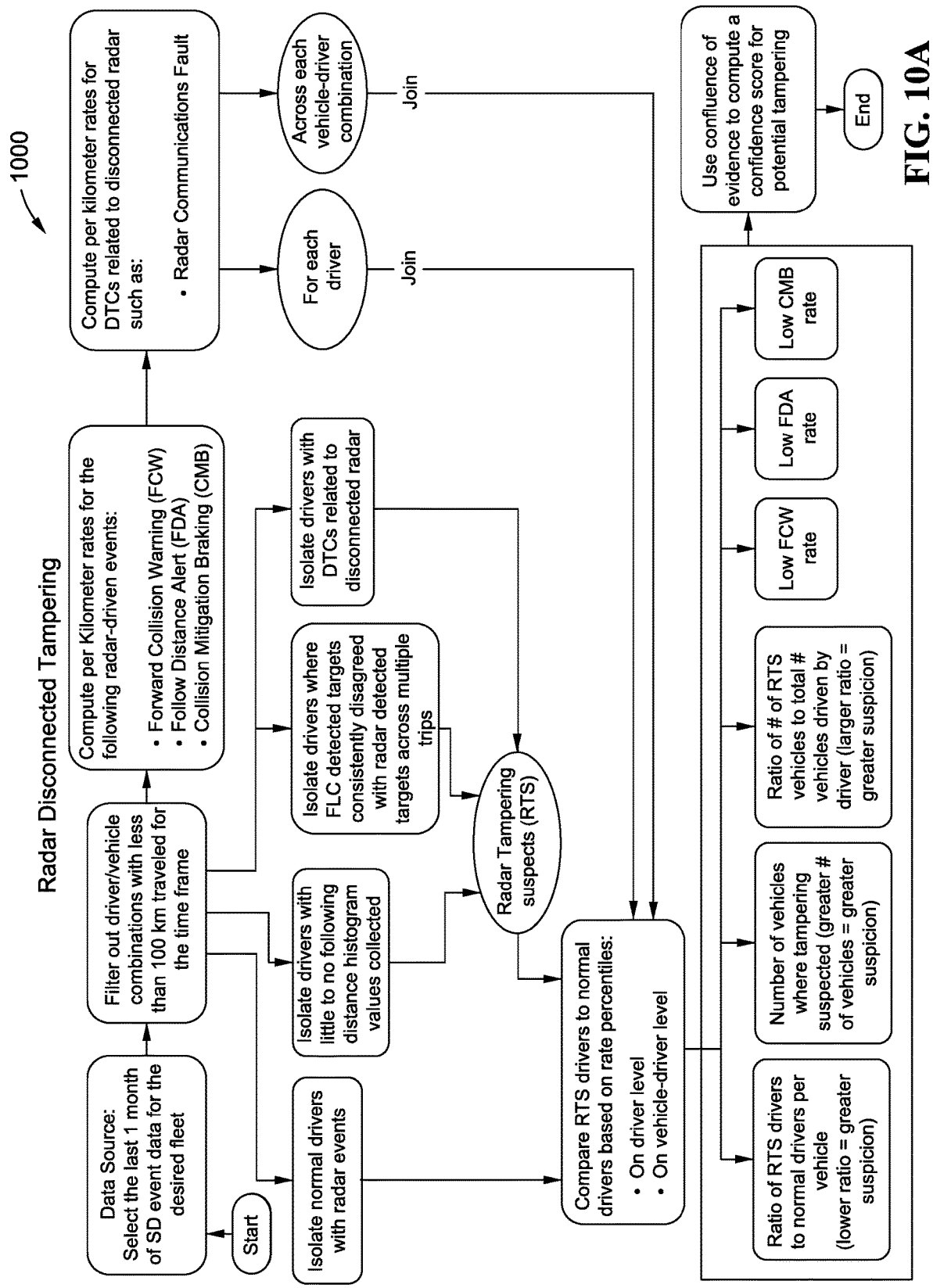
FIGS. 10A-10B illustrate processes for carrying out one or more aspects of the invention in the context of possible radar tampering.
Figure 10B:
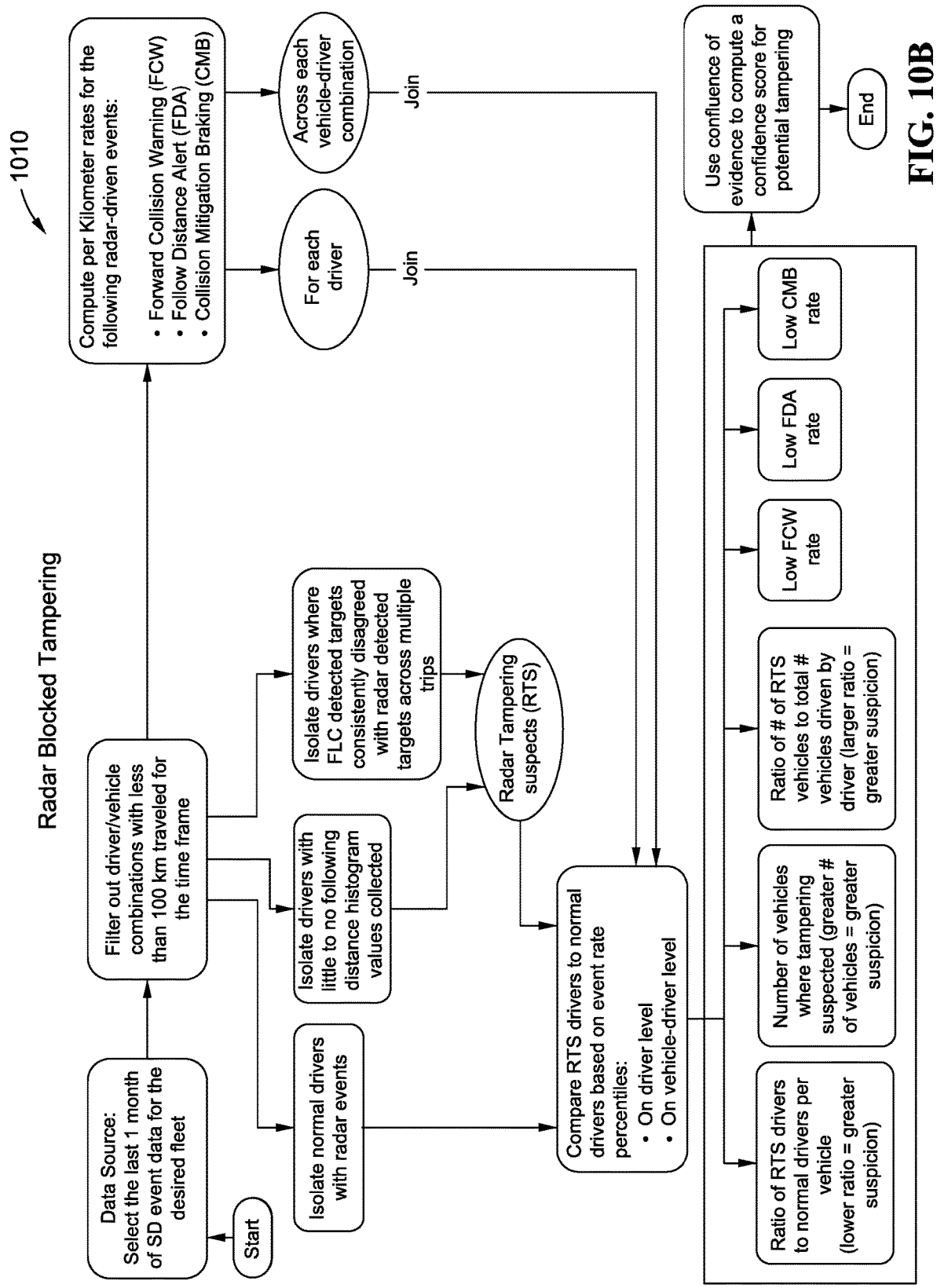

With respect to the detection and processing of a potential radar tampering, one embodiment for carrying out a process for generating a confidence score that a particular driver has tampered with a vehicle's radar system by disconnecting the radar is set forth in FIG. 10A, while a corresponding process for detecting blocking of the radar is set forth in FIG. 10B.

Figure 11:
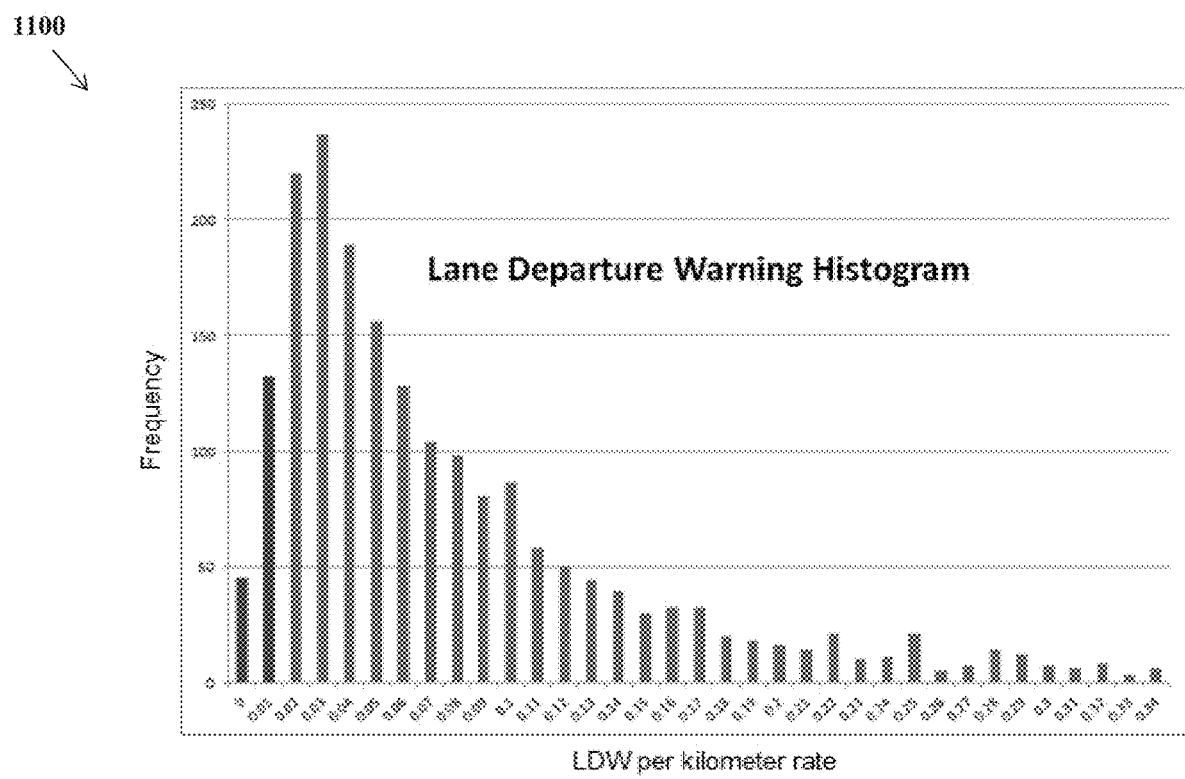
FIG. 11 illustrates a histogram of a distribution indicative of tampering.

Referring now to FIG. 11, depicted is one embodiment of an LDW rate histogram 1100 which illustrates how frequency of occurrence of an LDW DTC/event when plotted against per kilometer rates can be used to indicate when potential tampering has occurred. Specifically, the low frequencies at 0 and 0.01 LDW per kilometer are indicative of tampering as such low rates very rarely exist, even for trained professional drivers.

Figure 12:
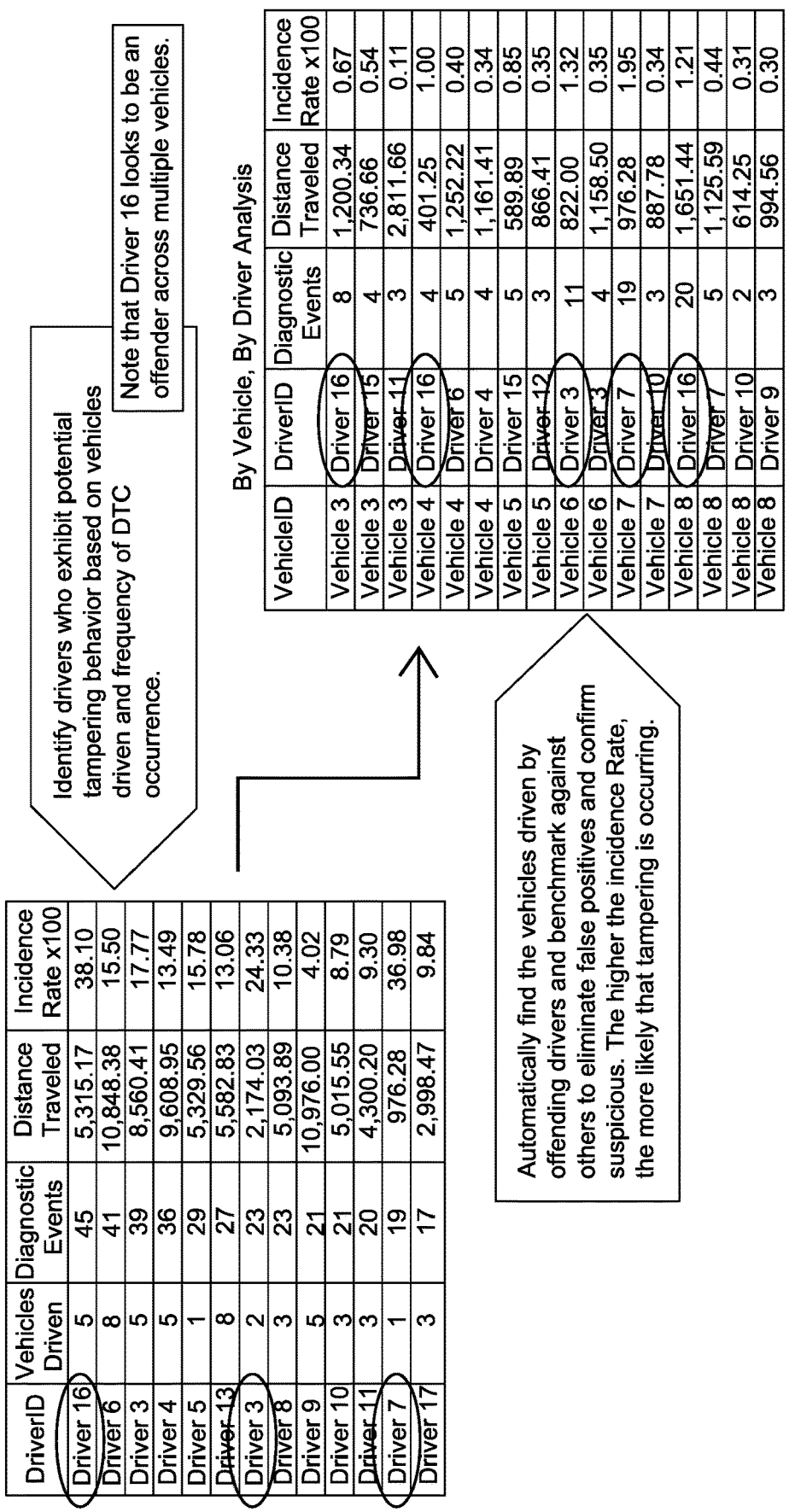
FIG. 12 illustrates a partial graphical user interface correlating driver data usable to increase tampering analysis confidence.

Referring now to FIG. 12, depicted is how a graphical user interface of tabulated driver and vehicle data can be used to identify potential tampering candidates, and compare those drivers against other drivers who have driven the same vehicle(s) to eliminate false positive and confirm suspicions. (See block 450 of FIG. 4). For example, the left side of FIG. 12 shows that drivers 3, 7 and 16 have statistically relevant deviations with respect to their incidence rates per 100 km driven, while the right side shows that driver 16 has higher statistically higher DTC/events than several other drivers who have driven the same vehicles as driver 16. This, like overlapping tamper indicators, can be used to establish a high confidence that tampering has occurred.

Figure 13:
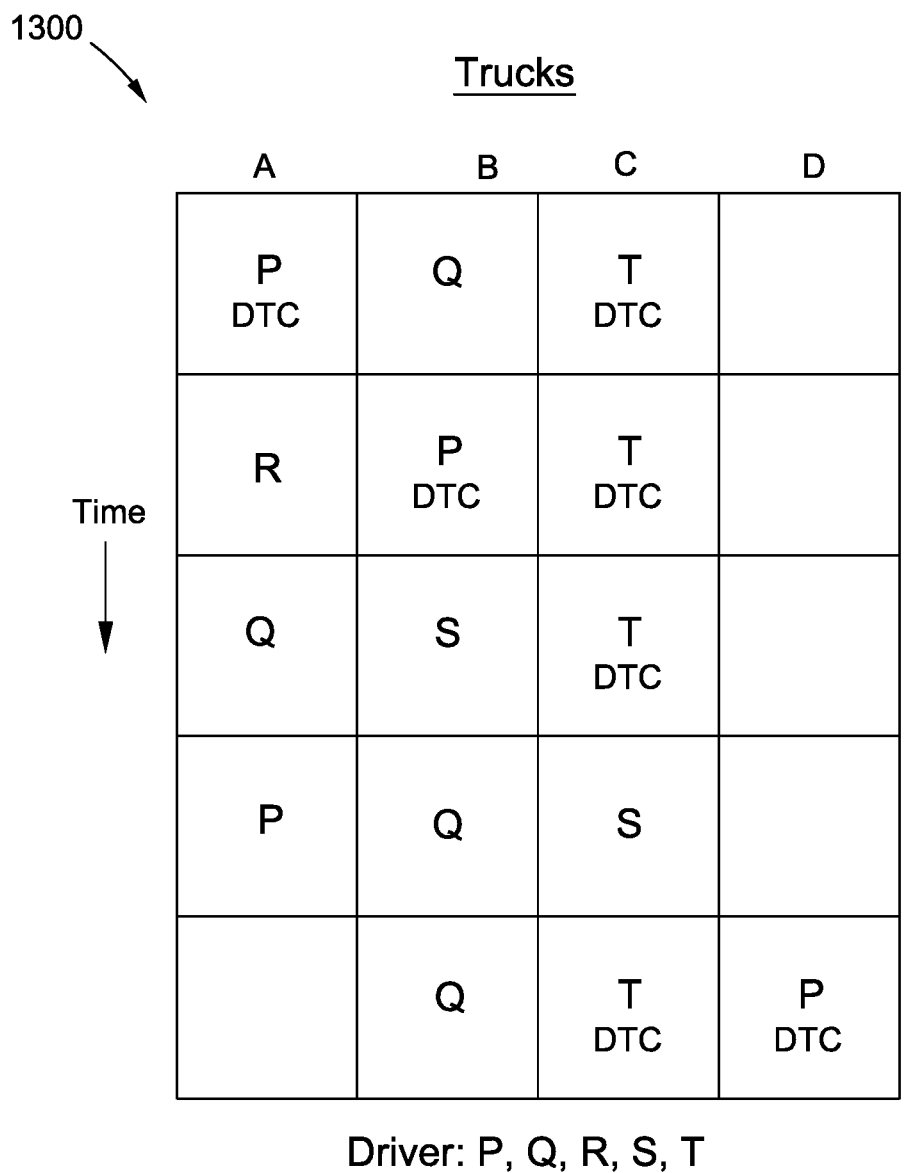
FIG. 13 illustrates a table correlating vehicles and drivers that is usable in implementing one or more aspects of the invention.

Now, with reference to FIG. 13, a group of truck drivers may use various trucks for a period of time such that at least some of the trucks are used by multiple drivers. Statistics relating to driver performance and DTCs may be collected over the period of time and used to identify drivers who are tampering. For example, table 1300 of FIG. 13 shows trucks A-D being used by drivers P-T over a period of time, shown as rows. For purposes of illustration, only one type of DTC is considered, whereas in reality multiple types may occur.

Table 1300 may be evaluated to discern if a pattern exists which may indicate tampering. For example, driver P has driven three trucks: A, B and D. For most of the drives P has taken across all three vehicles, the 'possibly tampering' behavior, i.e., DTC sequence, occurs. For drivers Q and R on these vehicles, however, no such DTC has occurred. The fact that P has experienced the DTC across multiple vehicles is unusual already and possibly indicative of tampering. Even more indicative of tampering is that driver S takes over truck B directly after driver P, yet does not experience the DTC. This pattern is considered indicative of tampering.

Furthermore, table 1300 shows that driver Q has not experienced any DTCs in any vehicle. Moreover, driver T has a DTC each time he drives truck C, but driver S does not experience the reoccurring DTC when he drives truck C. Here again, it appears the DTC is specific to driver T, not to truck C, which suggests tampering.

Figure 14:
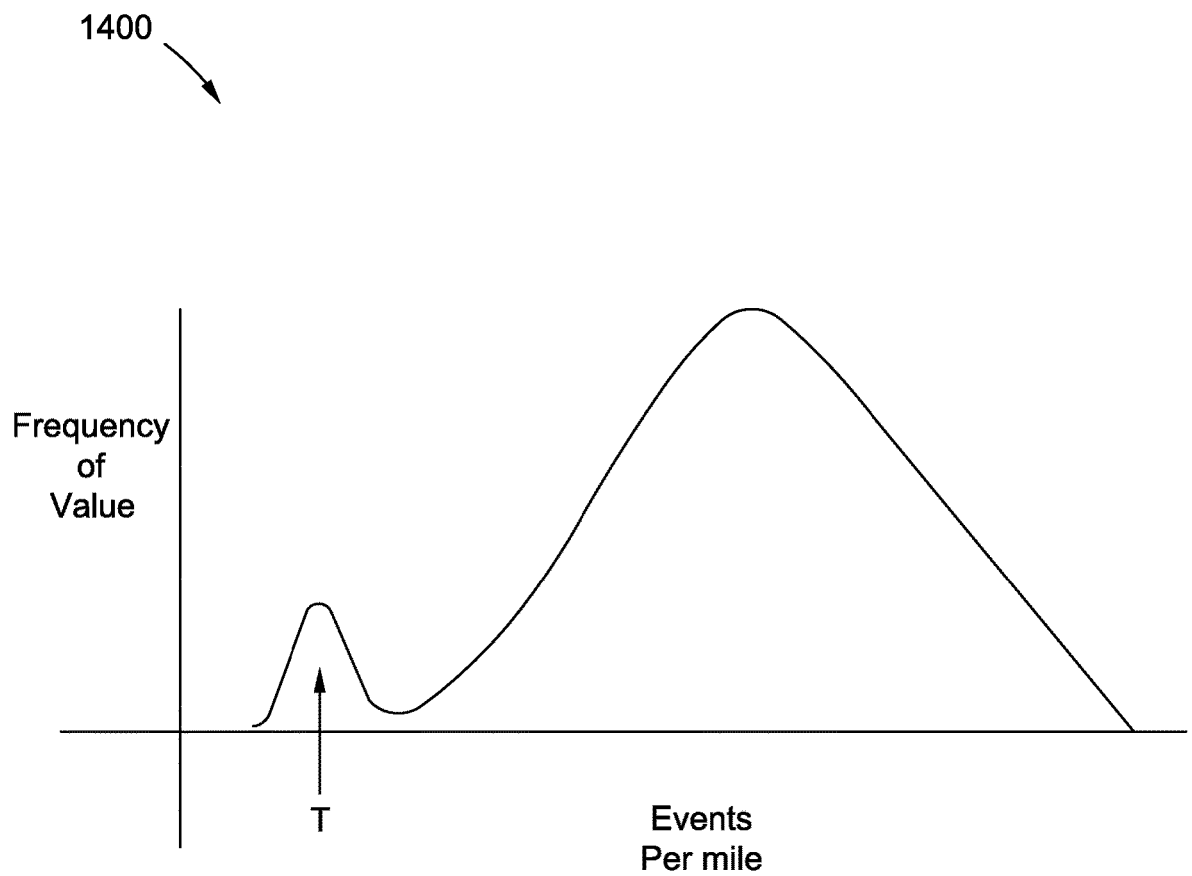
FIGS. 14-16 illustrate various statistical patterns that are indicative of possible tampering, in accordance with the principles of the invention.

Referring now to plot 1400 of FIG. 14, statistical patterns may also be used as tampering evidence. Here, because a sensor has been disabled or impeded in some way, given the DTC, driver T's statistics for the behavior associated with this DTC/sensor will be very good, with a low number of events per mile. As such, a threshold for suspicion (e.g. at or below 10th percentile of all drivers, a relative criterion, or at or below 1 event per 100 miles, an absolute criterion) may be used to compare driver T with his colleagues. If this threshold is met, we may either not use the miles with the DTC present, add a chosen amount of tampering probability to this driver's 'evidence basket', discount these miles, choose to speak with driver T, or take some other action. These other actions may include inducing a change in vehicle behavior (e.g. the driver blocked the forward camera, so should not be able to drive as fast), turning on an indicator or warning for tampering, visible or audible to the driver, increasing automated vehicle intercession levels, or making other remaining warnings more bothersome (e.g. more easily triggered, louder, shriller), thereby nullifying the reduced annoyance gained by the driver's tampering.

Figure 15:
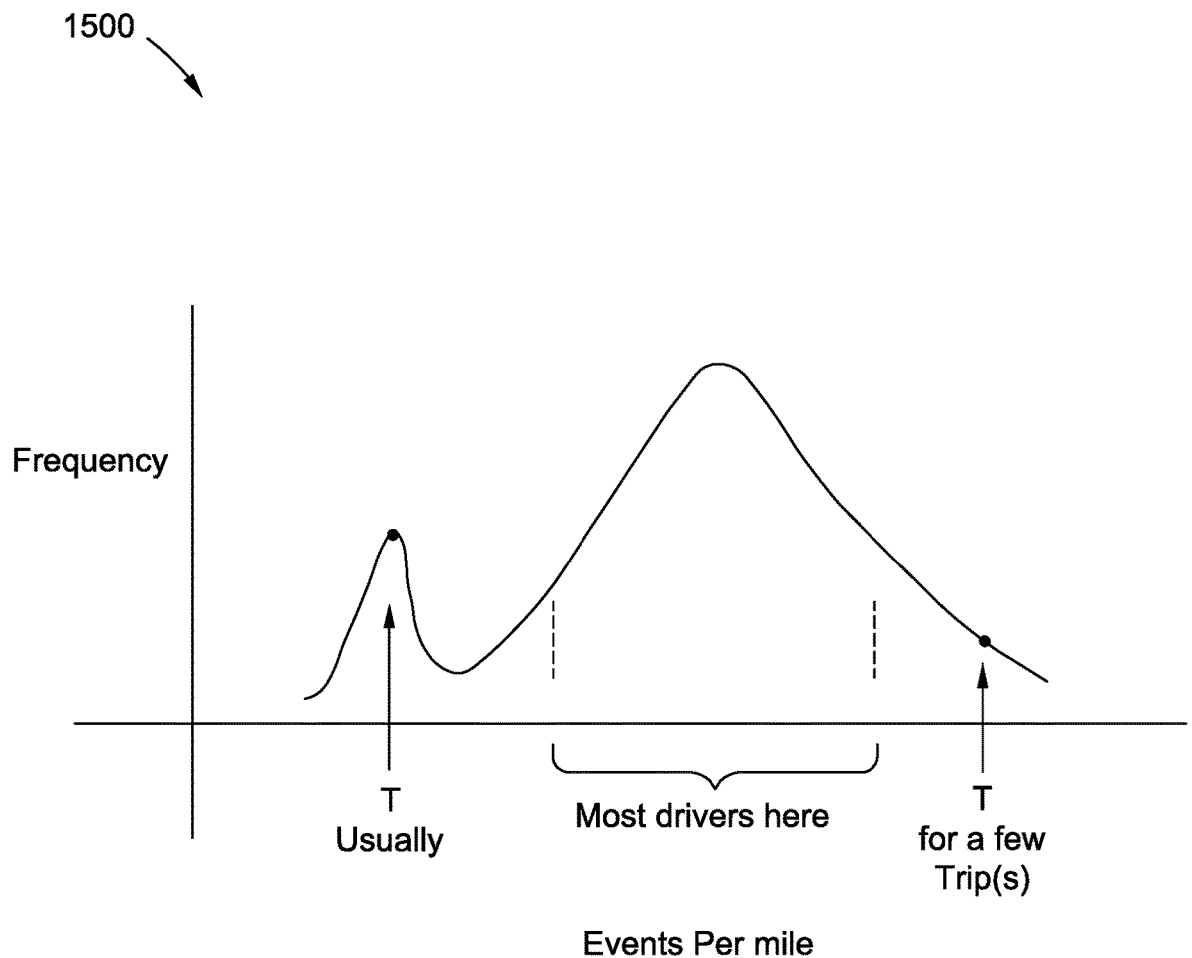

Referring now to plot 1500 of FIG. 15, suppose now that T drives truck D just before driver P gets it, but without tampering for once, hoping to hide his habitual tampering. Suppose, furthermore, that driver T now gets a worse than usual, so higher, events per mile figure for that trip, which would lie somewhere to the right on the frequency/histogram plot 1500. The more to the right and the longer the trip is, the less likely it is that driver T has very good or very bad behavior. Given that we see DTCs occurring during the ostensibly very good behavior, one may choose to disbelieve those too-good-to-be-true episodes.

Of course, it is still possible that driver T is experiencing unusual mechanical situations, such as a defective and hard to control, truck, a difficult route to drive, or perhaps traffic or weather were unusually problematic. Because more than just the driver's behavior plays a role, one option is to return an uncertain, but measurement-based, probability that driver T is tampering, rather than making a yes/no determination.

Figure 16:
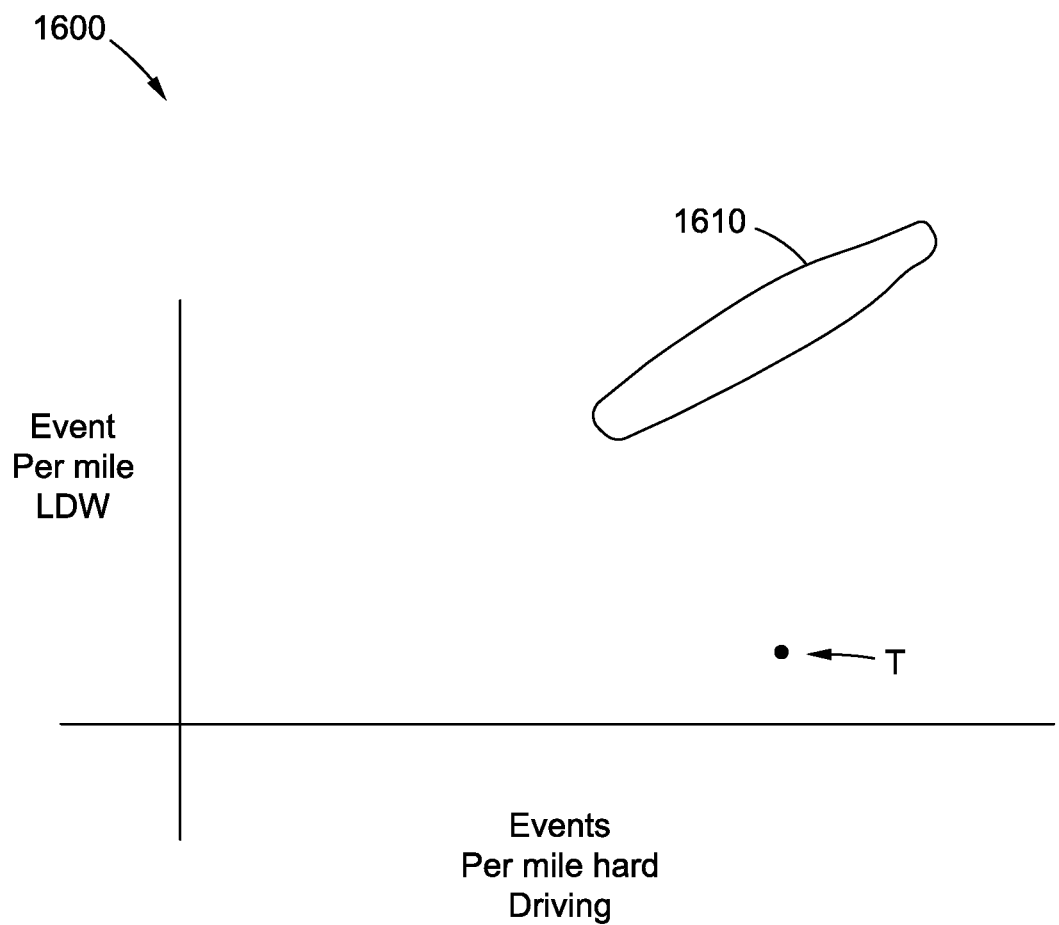

Suppose that driver T only tampers in one way, therefore appearing to be very good in that associated measure but is similar to other drivers in various other measures. This constellation of "just average by nearly all measures but really good on one" is itself unusual. Suppose that driver behaviors cluster and correlate, e.g. in the number of LDW events per mile and the number of hard braking events per mile. Although clustering may occur in more than two dimensions, the plot 16 of FIG. 16 shows how driver T is an outlier of driver cluster 1610, which is comprised of events per mile for LDW plotted as a function of events per mile for hard braking events. Here, Driver T however, may also sometimes cover the camera, and therefore only gets a few LDW events, making her an outlier from driver cluster 1610.

FIG. 16 also illustrates how the number of events per mile for different event types correlate with each other, with the exception of driver T. To that end, for driver scoring purposes, driver T's abnormally low LDW figure may be replaced with the value driver T would have as part of the group, since a driver is arguably similar to her colleagues. It is therefore not unfair to replace the one outlier measurement with the value that her colleagues would have. In making this replacement, we match driver T better with the others, and so her score (made from a combination of many events and her behavior there) is more average and she does not get the improved score she desired via tampering. Confidence bounds on the model for the other drivers, such as the estimated standard deviations of the slope and intercept values—for the line fit example here—may be applied to still let the driver be better than her companions, but within bounds. For instance, 3 standard deviations of the slope value, downward, might be allowed, and move the driver's corrected, accounting for the group, final LDW value to somewhere between what is measured and the average of the group, thus still in the direction of the measured value but to a more plausible value.

Figure 17:
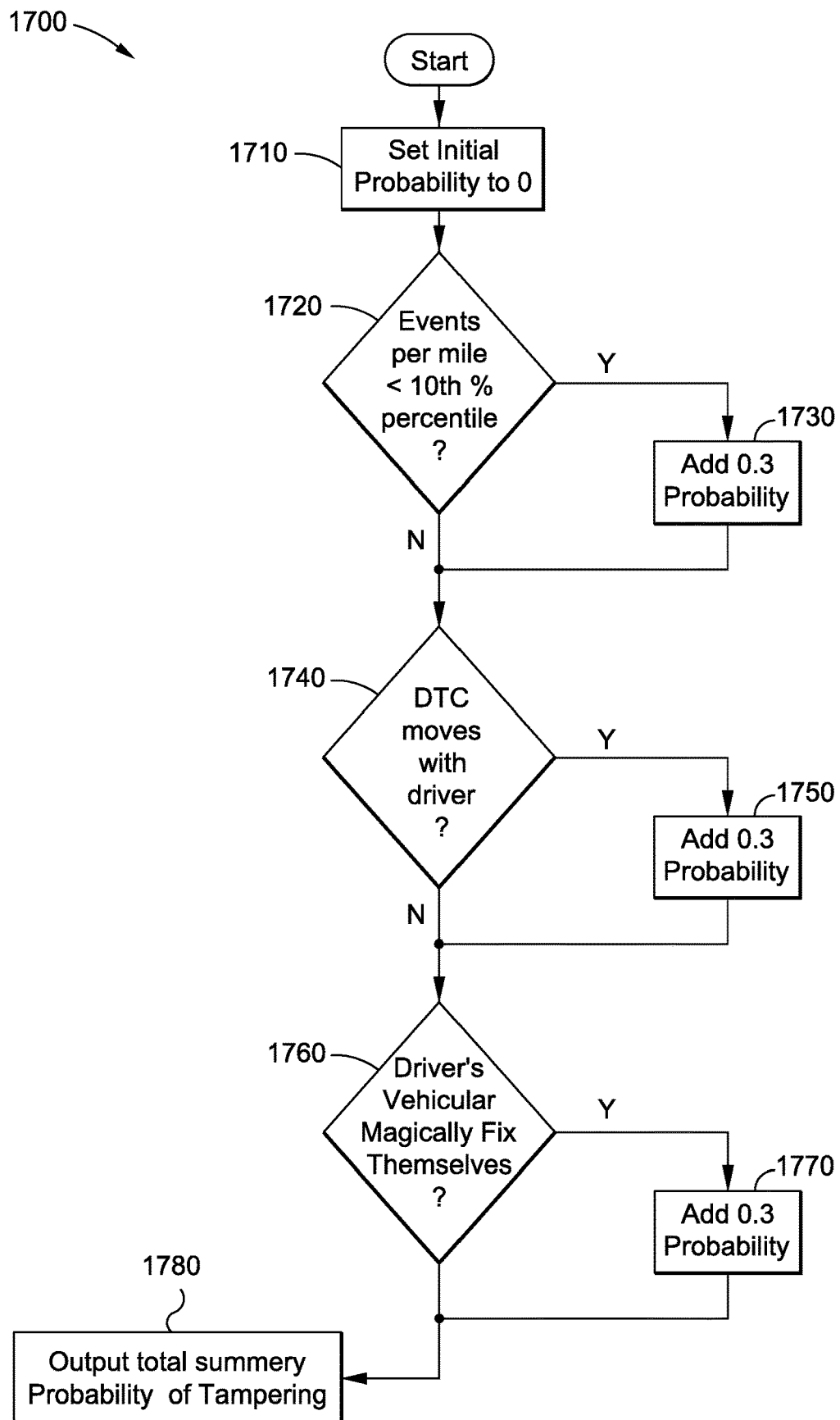
FIG. 17 is another embodiment of a general process for carrying out one or more aspects of the invention.

Referring now to FIG. 17, one embodiment of a process 1700 for tampering detection is set forth in which evidence is accumulated and increase tampering probability is calculated when certain conditions are met.

In particular, process 1700 begins at block 1710 where the initial probability is set to 0. A determination is made at block 1720 if the driver's events per mile rate for a specific event type is less than the $10^{th}$ percentile, for example. If so, the probability of tampering is increased at block 1730. If not, process 1700 continues to block 1740 where a determination is made as to whether the particular DTC appears to follow the driver from vehicle to vehicle. If so, the probability of tampering may again be increased at block 1750. If not, process 1700 continues to block 1760 where a determination is made as to whether the DTCs experienced in the driver's vehicle(s) do not similarly occur when other drivers are driving those same vehicles. If so, once again the probability of tampering may be increased at block 1770. The summation of the probabilities may then be output at block 1780. While the accretion is done in this example by addition, other arithmetic and numerical operations may be used, such as multiplication, driver rate placement along a distribution curve using percentiles, taking the maximum of a set, etc. The constituent elements of this (chained, serial) scheme are (i) a test with a threshold, parameters, or condition, (ii) a consequence/operation for the probability of tampering, and (iii) a continuation to the next test.

A tampering detection scheme will define the tests, with their thresholds or associated parameters, and each of the consequences, with their associated parameters and operations. A final block examines the confluence of evidence created by the test series, and delivers a confidence level to the end user.

In one or more of the aforementioned embodiments, another aspect is for the on-vehicle event detection and reporting system (e.g., 200 of FIG. 2A) to be configured to generate a vehicle event in response to suspected tampering. Such an event may be generated, for example, in response to there being little to no radar following distance histogram data for N or more minutes, or that there is a mismatch between camera and radar targeting for some period of time beyond normal, M or more minutes. Numerous other sensor-related variables may be evaluated for suspected tampering and used to generate, on the vehicle, a vehicle event.

In response to a suspected tampering event being triggered on the vehicle, the event may be reported to a backend server, consistent with other types of vehicle events described above, e.g., hard braking event, lane departure warning event, forward collision event, etc.

In addition or instead of, however, it should further be appreciated that this type of event may further trigger collection of tailored or additional data with higher detail from the vehicle's various sensors, including radar and camera targets (and absence of such) over a specific time window.

Detecting and Classification Using Machine Learning

Another aspect of the invention is to detect and classify tampering using machine learning technology. One machine learning approach is a probabilistic detection that tampering has occurred on a vehicle using, for example, Naive Bayes. This detection may be carried out on the vehicle in real-time or shortly after suspected tampering has occurred. As noted above, this detection may trigger a potential tampering event that transmits typical vehicle data along with tailored data useful for tampering analysis and evidence based on one or more suspected tampering type(s), such as radar and camera targets over a specific window of time for camera or radar tampering, to a backend server when said tampering is suspected.

A second approach to machine learning is a classification approach, which can function as either a standalone tampering classification or to validate the probabilistic tampering detections generated by an embedded machine learning approach, as set forth above. This approach operates on the server-side using classification based on a confluence of collected vehicle and fleet data from before, during, and after each trip. This classification approach is intended to generate specific tampering classifications and to fix possible incorrect detections from the probabilistic (Bayes) approach above. It can be implemented in a tampering event filtering mechanism for incorrect detections on the server-side, which can function as feedback for the above probabilistic approach. That is, the computationally more powerful server can further accept, reject, refine and tune the possibly oversensitive tampering detection running on the vehicle.

Regardless of the machine learning approach used, the data used may be preprocessed in order to meet appropriate criteria to function as input to the machine learning methods. Preprocessing may include one or more of the following operations performed on the data:
Normalization
Standardization
Filtering
   Smoothing, gap-filling, de-noising, etc.
Transformation
   PCA, SVD, log 2, log 10, etc.

Data collected or derived from one or more vehicles and thus one or more drivers may be used directly, with or without preprocessing, and/or in summarized form, as machine learning method input data features. Below are examples of data features that may be used consistent with the principles of the invention:
Event sequences from one or more of the most recent trips traveled by vehicle when driven by one or more drivers, which may include the following vehicular data:
   Event type
   Timestamp
   GPS location
   Vehicle speed
   Vehicle odometer
   Vehicle location
   Vehicle accelerometer values including X, Y, Z axis
   Vehicle turning force
   Vehicle braking force
   Road curvature
   System component and sensor warnings, faults, CAN messages, and DTCs generated during the event Radar information such detected targets, timestamps, target longitudinal distances from vehicle, TTC, target width, etc.

Camera information such as detected object tracks, timestamps, track longitudinal distances from vehicle, TTC, track object width, etc.

Traffic sign information such as detected speed limit

Driver behavior information derived from vehicle and video information

Event rates per kilometer

This metric may be computed from a combination of one or more of the event types and utilized as necessary to detect/classify tampering.

DTC rates per kilometer

This metric may be computed from a combination of one or more of the DTC occurrences. It may be utilized as necessary to detect/classify tampering.

Event statistics, i.e. average distance from LDW to LOVT events

Vehicle Speed Histograms for trip(s)

Speed Sign Histograms for trip(s)

Following Distance Histograms for trip(s) (based on radar target detections)

Video data collected around and during events from cameras.

Additional Statistical Methodologies

In addition to the statistical methodologies described above, it should further be appreciated that one aspect of the invention is that statistics may be collected over time for events, of different categories, for multiple drivers. Drivers may be compared with one another by their miles between event values (MBE), whereby bad drivers would have low MBE values relative to good drivers with higher MBE values. A single, summary, score may be calculated from the MBE figures. In this context, multiple types of statistics may be used to deduce evidence of tampering, including distribution-based, time-based, and inference-based methods. Additionally, a combination of the probability values resulting from each piece of evidence may be used with Bayes' Rule with a bypass option to get a single, final, probability of tampering, value.

(i) Outlier identification from distribution analysis and probability value assignment therefrom:

With this statistical method, drivers with abnormal MBE values are identified and compared with other drivers, resulting in a distribution of MBE values. MBE values, for multiple drivers, for the fault of interest, e.g. lane departure warnings, may then be plotted and a model fit to the MBE values. This model might be a normal distribution, a lognormal distribution, etc. The mean and variance of the distribution may then be determined. Those values further than at least, say, 3 standard deviations from the mean (to the good performance side) may be deemed to be outliers. The probability values of these 'too far away to be true' observations (e.g. 99th percentile) may be used as one input to the probability of tampering calculation. While this single probability may be useful, it is not necessarily sufficient to establish tampering. It is also possible that one has no observations further than 3 standard deviations from the mean, in which case the driver may be deemed to not be tampering.

Next, the percentage of time that the system is disabled may be taken into consideration, either directly or as a distribution percentile. The same 'outliers are observations further than 3 standard deviations from the mean' mechanism may be applied again. For instance, if drivers have disabled the system for between 5 and 65 percent of the time, with mean 25% and standard deviation 5%, then all drivers with disabled percentages over 40% may be deemed to be outliers, and e.g. 64 percent may correspond to the 99th percentile, and so probability 99%.

(ii) Probability Value Assignment from Missing Event Run Lengths Via Poisson:

The second statistical method, which is time-based, relies on the Poisson distribution, where the MBE values function as the single parameter needed to specify it. In this case, the probability of no events happening over a given period may be calculated given the MBE value and assuming the Poisson characteristic.

If these missing lane departures 'occur' in a contiguous block longer than 15 minutes (the disable switch active time), that is also unusual, as the driver's behavior is presumably similar over all times. Statistics, e.g. the Poisson distribution with its 'usual frequency of events,' may be used to detect unlikely runs of missing events.

An event can occur 0, 1, 2, . . . times in an interval. The average number of events in an interval may be designated (lambda) and may include a fractional value. Lambda is the event rate, also called the rate parameter, and corresponds to the inverse of the miles between events value, which is events per mile in this case. The probability of observing k events in an interval may be given by the equation:

$$P(k \text{ events in interval}) = e^{-\lambda}\frac{\lambda^k}{k!}$$

For example, assume that 1.2 lane departures per mile is observed for a driver when the system is not disabled. For a 10 mile stretch with the system ostensibly not disabled or unavailable, we would expect to observe 12 lane departures. However, if we see 0 lane departures, the probability of this occurring is $e^{-12}$, which corresponds to the very low value of ~0.000006. In this case, the probability of tampering may be taken as 1.0 minus this value, or ~1.0. This Poisson statistics based method may be used to detect temporary tampering, where the driver removes his worst performance from a majority of more normal behavior. In order to identify the interval when tampering might be expected to happen, and within which this Poisson test may be conducted, it is useful to examine whole trips—tampering is more easily done if for a whole trip—and also for known difficult sections of road (e.g. narrow, winding roads) or at known difficult times (e.g. very late night driving). This identification of difficult intervals reduces computation and searching for tampered with intervals. It is also useful to run an initial event density calculation over the driver's trips or sections thereof, then focusing on those with lower density to see if implausible runs of no events occur.

(iii) Correlation- and SVD-Based Methods for Inferring Correct, Untampered, Values and Detection:

The third statistical method relies on correlation and the predicted value. This method assumes that it is probably more likely that a driver who tampers in one way may also tamper in another way or on another truck, and therefore produce abnormally good MBE values in another category as well. As such, the MBE and score matrices for drivers and event types may be analyzed with this in mind, looking for associations and deviations that we may exploit.

For example, imagine that we find a linear correlation (other models are possible) of 0.75 between the MBE values for drivers' lane departure values and headway warnings. The headway warning MBE for a driver may be determined, passed through the fit equation, from which a predicted LDW MBE value may be derived. Assuming most of the drivers used to derive the fit do not tamper those drivers who do tamper will show abnormal deviations to the good behavior side for their LDW MBE. Those drivers who lie far from this correlation fit, on the 'too good to be true' side of the line, are suspicious. From there thresholded values of Cook's distance times the correlation coefficient may be used as a metric for detecting possibly tampering drivers. The multiplication by the correlation coefficient protects against using unreliable models.

An alternative approach is given by recommender systems. A mathematical framework for recommender systems may be applied to analyze the final score that a driver receives, which combines multiple abilities and behaviors into a single value. For example, drivers in general may be assumed to have underlying abilities, say longitudinal distance keeping, lateral position holding, visual acuity and fatigue resistance (many others are possible). If we remove the suspicious MBE values, we can then infer what they should be based on the non-suspicious MBE values and what we know about similar drivers, producing a cross-validated residual. Suspicious MBE values can be identified as those having a large deviation from their expected value. A Chi-squared statistic gives a probability value for the deviation between the measured and expected values.

(iv) The Past Disproved by the Present I—Disappearing Defects (DTCs):

Vehicle defects do not typically correct themselves. That is, for example, an LDW disable switch that is defective at one point in time is very unlikely to fix itself at a future point in time without repair. This approach recognizes that although a driver tampers most of the time to avoid warnings and score highly amongst their fleet, they may also intend to cover up their 'too good to be true' score with a few normal events randomly spread across a detectable, measurable set of trip segments randomly spread throughout a geospatial area over time without tampering with the vehicle. It may be found, however, that another driver uses the same vehicle before or after the tampering suspect but does not experience vehicle defects outside of normal vehicle behavior. In either case, the defect associated with the particular vehicle would appear to have fixed itself.

With this in mind, the presence of DTCs followed by the absence of said DTCs may be identified, such that previously unsuspicious DTC occurrences may be flagged as suspected tampering with some probability after multiple disappearing or reappearing defects are detected. It should be appreciated that both the occurrence and absence of DTCs for the same driver-vehicle combination may be required to assign a probability of tampering to the driver.

(v) The Past Disproved by the Present II—Disappearing Defects After Confrontation:

Suspected tampering drivers may attempt to change their behavior back to normal (i.e., no longer tamper) when they suspect that the fleet manager may have discovered their tampering behavior. As such, a sudden lack of DTCs potentially coupled with a suddenly worsening MBE or driver score may build evidence for a case of tampering because the driver will attempt to return to their normal driving behavior after confrontation. Their score will become normal if they correct the vehicle system(s) and/or sensor(s) once spooked by confrontation. The driver may also react this way if they notice different suspicions of the fleet managers, other drivers, etc. in interactions, which could be taken as further evidence of tampering.

As such, standard statistical tests, such as Student's T, may be applied to see if a driver's MBE values suddenly worsen after confrontation about either a vehicle health problem (i.e., lack of event type X data, many non-normal data values over time), or potential behavior issues, such as driver event rates disagreeing with other drivers for the same vehicle. If the average MBEs before confrontation, say over a month, are significantly better than those for the month after confrontation, the confidence level that tampering has occurred correspondingly increases, assuming that the driver's route or traffic conditions or weather have not significantly changed.

In additional embodiments, a secondary, seasonality factor for time of year may be derived by analyzing MBE or score value trends. This secondary factor may be used for improved driver score prediction and provide a mechanism to determine when a driver deviates from their 'normal' behavior. For instance, hard braking events may be more common in the winter months because of the lower friction typical then, and this should be accounted for when predicting driver scores.

Also, it may be possible to examine such month before and month after statistics every week to determine if a driver is worsening behavior-wise, for whatever reason. This may trigger a warning on the fleet manager server to confront the driver about the presumed tampering type or poor driving behavior detected over time. The driver can then be tracked for tampering-like behavior and driving performance over time.

(vi) The Defect goes with the Driver Defects—Reappearing DTCs for the Same Driver Across Multiple Trucks:

Some drivers who use multiple vehicles may engage in tampering across these vehicles. This results in a similar pattern of tampering-like behavior that appears to follow the driver from vehicle to vehicle. Such a correlation is direct evidence of tampering. A cross-vehicle fraction of time a driver tampers may be calculated according to: Maximum over all trucks and all trips that driver uses of (miles driven without event, thresholded at factor * driver's usual MBE for the event/total miles that driver uses the truck).

The above expression accounts for a driver using multiple trucks, for multiple trips, and allows for unlikely (but possible) runs of event-free driving, and normalizes by how many miles each truck is used by the driver. In essence, a maximum fraction of event-free driving is derived, which if too high, is suspicious. It should be appreciated that the root mean square value may be used instead of the maximum, which favors the worst-case tampering trip, but also accounts for episodes without tampering.

(vii) Consideration of Additional Information:

Another aspect is to verify borderline cases or simply be more certain that tampering is occurring, by considering additional information. To that end, special data collection modes may be triggered to do this.

For example, in the case of LDW, lane position varies in a statistical manner. It is typical for many truck drivers, for example, to stay nearer the right lane marking, thereby avoiding vehicles passing on the left and being nearer safety, should they need to stop. As such, it may be desirable to trigger a lane position and lane width histogram collection mode that runs in spite of no warnings being issued, and returns to a specialized evaluation and prediction module which computes confidence(s) of 'what-if' events occurring based on typical driver behavior for the conditions. Expected 'regular' and 'severe' lane departure frequency MBE values may be derived using observed fleet behavior statistics. With this, the measured, abnormally good, LDW MBE values may be replaced with more realistic ones on the vehicle or in the server-side driver scoring process as generated by a scoring algorithm which may use statistics or machine learning based on the normal vs tampering driver behavior to replace 'too good to be true' values with normal when tampering behavior is detected. This new, recomputed score absent of tampering could be displayed to the fleet manager on the fleet server to trigger a discussion when "actual" and "recomputed" score values deviate beyond Y points from each other.

The probability of tampering may be used to discount the miles used in scoring. The scoring calculation involves the miles between events (MBE) value for each event type, and combines these in a weighted fashion. Suppose that the final probability of tampering is Pf for a particular sensor. This sensor might be the FLC, used in LDW, for example, so that the tampered with miles used in the LDW scoring calculation shall be discounted. Pf may be a continuous value between 0 and 1, a binarized, thresholded value (discount tampered miles only if sufficiently sure that tampering is indeed occurring) of the originally established probability of tampering, or a transformed version of the originally established probability of tampering (e.g. a shifted, sigmoid-shaped, soft thresholding operation). MBE is calculated by discounting the tampered miles (taken, say, as trips, or episodically):

*MBE*=sum over all trips or episodes of (miles*(1.0−Pf))/(total number of events for all trips or episodes).

This calculation effectively reduces the number of artificially good miles used in the MBE calculation. If no tampering is deemed present, it is the original MBE formula.

In addition, it may also be desirable to reinstate warnings based on this more accurate LDW MBE value. The driver is thereby sensitized to the special monitoring mode being active and is provided with fleet-required warnings. The above 'disappearing defects after confrontation' statistical test may then be used.

Finally, another example of additional information is direct detection, whereby the affected area is observed with a camera (e.g. look at the disable switch, the steering column, etc.). Long term changes from its expected appearance, especially in the edge image (which is less sensitive to absolute lighting levels), may be taken as further evidence of tampering (e.g. the disable switch is stuck in permanently disabled due to an object jammed into it).

(viii) Correction of Weights for Combining Rules with Admissions and Denials of Tampering:

Drivers may admit or adamantly deny that they tampered when confronted. This admission of guilt or adamant denial may be back propagated into the factors that produced the suspicion. For example, if a driver is suspected of tampering to improve her apparent lane departure behavior from abnormally high MBE LDW values, but points out that they never have had any side damage to their vehicle (counter-evidence, indicating good lane keeping behavior), the factor(s) associated with the deviant MBE value may be reduced. In this case, the driver was indeed good at staying in her lane. In this manner, we can refine the coefficients for discerning tampering.

On-Vehicle Tamper Detection

As detailed above, tamper detection looks for changes from past behavior, implausible deviations from fleet norms, and DTCs that follow the driver across vehicles. As such, if such fleet norms are transmitted to the vehicle, tampering detection may be done in situ.

In the case of analyzing past behavioral changes, statistical information relating to such past behavior may be stored on the vehicle, such as a driver's miles between events, the uncertainty of such events, etc. Current driving behavior may then be compared to past behavior on the vehicle.

Implausible deviations from fleet norms can be used to compare a given driver to how other drivers perform. A backend server which is in communicate with fleet vehicles, may transmit to the vehicles critical percentiles or thresholds for MBE values for different event types. A comparison with a driver's current MBE figures may then be carried out on the vehicle. Alternatively, if multiple drivers have used a given vehicle, a comparison with this group of drivers may be carried out, or even more simply, a fixed, 'too good to believe', threshold.

DTCs that follow a given driver are another indication of tampering. These DTCs are specific to the tampering type, and are limited in number. It is proposed that a summary of such driver-associated DTCs be requested from a backend server on or in connection with vehicle startup. For the proper DTCs to be sent, the driver's probable identity may be used, or alternatively, a fleet wide set of driver DTCs may be provided to the vehicle. The information needing to be sent may be narrowed with knowledge of which vehicle is receiving the information, what time it is, where the requesting vehicle is located, etc. Once this transmission is done, there are three references with which to compare:

establishing driver's probable identities computing the driver's current performance figures, as MBE values detecting when the vehicle exhibits phenomena as described in paragraph [00108]-[00125] while a specific driver is at the wheel.

MBE values are advantageously computed by recursive methods. Recursive mean filtering, such as in the following algorithmic relationship:

$$\mu_n = \frac{1}{n}\sum_{i=1}^{n} x_i$$
$$= \frac{1}{n}\left(x_n + \sum_{i=1}^{n-1} x_i\right)$$
$$= \frac{1}{n}(x_n + (n-1)\mu_{n-1})$$
$$= \mu_{n-1} + \frac{1}{n}(x_n - \mu_{n-1})$$

In connection with such a recursive filter, data may be collected for each event type, with the last odometer setting being stored when a specific event type occurred. For instance, if a lane departure most recently occurred at odometer setting 11.2 kilometers (which value we store) and then occurs again at 15.7, the recursive mean filter above receives a new value of 15.7-11.2 or 4.5 km. It can be advantageous to store the (1/n) values beforehand.

Once enough MBE values have been accumulated for a given drive, a comparison may be carried out with respect to the driver's previously stored values or fleet norms. The variance of the values may be considered in this computation (both in the stored and current values, so producing a proper Student t-statistic). Alternatively, change detection methods, such as Cumulative sum may be applied, looking for discontinuities toward the too-good-to-be-true side.

Another aspect of the invention is to identify data inconsistencies as a means to generate a potential tampering event which transmits typical vehicle data along with tailored data useful for tampering analysis and evidence, such as radar and camera targets over a specific window of time, to a backend server when tampering is suspected. The detection using either the embedded processor/transceiver or a backend server may, for example, be based on factors such as:

i. Little to no radar following distance histogram data for >=N minutes
ii. Camera and radar target mismatch for extended period of time beyond normal, i.e. >=M minutes.

Certain factors will increase the confidence levels for certain, applicable tampering types. For example, the factors i and ii listed above may be indicative of radar or camera tampering but would need further analysis with more computational resources and fleet data than available on the embedded processor/transceiver to make a useful determination. This is why the relevant data is transmitted to a server when a potential tampering event is detected on the vehicle.

It should further be appreciated that tampering detections with reference to driver and vehicle ID, suspected tampering type, and location may be used in dashboard visualizations on the fleet web portal and in combination with other factors for tampering-aware driver scoring and score monitoring over time, also hosted on the fleet web portal. For example, the fleet management system may discount tampered miles (i.e., the miles covering a driving excursive during which tampering was detected), separately score tampering drivers, apply an adjusted criteria for scoring tampering drivers, or keep them on a tampering watch-list within the system, including on the fleet management server and web portal.

System Control Based on Tampering Determinations

Still another aspect of the invention is to provide one or more forms of system control in response to detecting driver tampering. In one embodiment, a determination that tampering has occurred may result in reactivating warnings that the tampering was originally intended to silence, activating or altering other warnings, and/or providing warning in an earlier fashion than with the usual parameterization. In addition, certain aspects of vehicle operation may be limited, e.g. max speed, until the detected tampering is removed or otherwise remedied.

In other embodiments, it may be desirable to provide notifications to the driver in the vehicle regarding the detected tampering, including notifying the driver of an adjustment to the control system on the vehicle because of abnormal or lack of sensor readings, etc. It may also warn the driver that the fleet manager will be warned about the tampering occurrence. It may attach to the driver's performance record for the fleet, which discounts or ignores the driver's performance associated with the period of time over which the detected tampering occurred.

In still further embodiments, a detected tampering may result in activation of one or more nominal filtered or derived sensor values based on other operational sensors to correct unordinary truck controls. For example, the system may provide steering corrections for lateral position (since the driver does not worry about lateral position as often without LDWs) and braking/throttle corrections based on longitudinal or accelerometer position, for example, riding up on the vehicle ahead or driving wildly along curves when sensed by fused camera and accelerometer values may trigger application of XBR or another braking mechanism such steer-by-brake, to mitigate potential accident when necessary. The driver's command values of these required—vehicles have a throttle, brake and steering—actuators may function as inputs to virtual sensors, replacing the tampered with sensors by their inferred, though imperfect, equivalents (FLC for steering, radar or lidar for throttle and brake)

Finally, driver feedback may be provided as to the extent to which the tampering was detected with one or more attendant negative consequences also occurring, including lower pay, suspension, termination, etc.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

The term "server" means a functionally-related group of electrical components, such as a computer system that may or may not be connected to a network and which may include both hardware and software components, or alternatively only the software components that, when executed, carry out certain functions. The "server" may be further integrated with a database management system and one or more associated databases.

In accordance with the descriptions herein, the term "computer readable medium," as used herein, refers to any non-transitory media that participates in providing instructions to the processor 230 for execution. Such a non-transitory medium may take many forms, including but not limited to volatile and non-volatile media. Non-volatile media includes, for example, optical or magnetic disks. Volatile media includes dynamic memory for example and does not include transitory signals, carrier waves, or the like. Common forms of computer-readable media include, for example, a floppy disk, a flexible disk, hard disk, magnetic tape, or any other magnetic medium, a CD-ROM, any other optical medium, any physical medium with patterns of holes, a RAM, PROM, and EPROM, a FLASH-EPROM, any other memory chip or cartridge, or any other tangible non-transitory medium from which a computer can read.

In addition and further in accordance with the descriptions herein, the term "logic," as used herein, with respect to FIG. 2A, includes hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fleet management server comprising:
    a memory;
    a wireless transceiver;
    a processor, coupled to the memory and transceiver, wherein the processor is configured to:
        receive, via the wireless transceiver, driver and vehicle information from a plurality of vehicles relating to a plurality of drivers,
        compute, based on the received driver and vehicle information, occurrence rates for predetermined vehicle events and predetermined vehicle error codes that are associated with possible vehicle tampering,
        compare, based on the received driver and vehicle information, an occurrence rate for the predetermined vehicle events and predetermined vehicle error codes of a first driver to occurrence rates for the predetermined vehicle events and predetermined vehicle error codes of one or more of the other plurality of drivers,
        determine, based on a result of the occurrence rate comparison, a tampering indicator for the first driver, and
        output, to a user of the fleet management server, a confidence level that the first driver has tampered with at least one information component of at least one vehicle of the plurality of vehicles based at least in part on the tampering indicator.

2. The system of claim 1, wherein the driver and vehicle information comprises braking event data, curve speed event data, lane departure warning event data, lane departure event data, loss of video tracking event data, lane departure warning system disabled event data, distance alert event data, forward collision warning event data, collision mitigation braking event data, and potential tampering event data.

3. The system of claim 1, wherein the occurrence rate for predetermined vehicle events corresponds to a ratio of a detected number of occurrences of the predetermined vehicle events to a total distance traveled over a defined period of time, and wherein the occurrence rate for the predetermined vehicle error codes corresponds to a ratio of a detected number of occurrences of the predetermined vehicle error codes to the total distance traveled over the defined period of time.

4. The system of claim 1, wherein the tampering indicator is determined for the first driver when the first driver satisfies one or more of:
    (A) having driven one or more of the plurality of vehicles for which driver tampering is suspected during a defined period of time,
    (B) having a high ratio of a number of vehicles driven by the first driver in which a predetermined vehicle event and/or predetermined vehicle error code occurs during the defined period of time to a total number of the plurality of vehicles driven by the first driver,
    (C) having, for one or more of the plurality of vehicles driven by the first driver, a low ratio of the plurality of drivers who experience the predetermined vehicle event and/or predetermined vehicle error code to a number of the plurality of drivers who do not experience any predetermined vehicle event and/or predetermined vehicle error code during the defined period of time.

5. The system of claim 4, wherein driver tampering is suspected for a vehicle, of the plurality of vehicles, when the vehicle reports at least one of the predetermined vehicle events and/or at least one of the predetermined vehicle error codes.

6. The system of claim 4, wherein the confidence level is based, at least in part, on the first driver satisfying one or more of (A), (B) and (C), wherein the confidence level increases as each additional one of (A), (B) and (C) is satisfied by the first driver.

7. The system of claim 6, wherein the confidence level further increases as:
    the number of vehicles in (A) increases
    the ratio in (B) increases, and/or
    the ratio in (C) decreases.

8. The system of claim 1, wherein the information component comprises one of a vehicle camera, a vehicle speaker, a lane departure warning disable switch, a steering angle sensor, a radar, and a lidar.

9. The system of claim 1, wherein the confidence level corresponds to a probability that the first driver has:
    disconnected or impaired the operation of a camera installed on the at least one vehicle of the plurality of vehicles,
    disconnected or shorted a speaker installed on the at least one vehicle of the plurality of vehicles,
    disabled a lane departure warning disable switch installed on the at least one vehicle of the plurality of vehicles,
    disconnected or disabled a steering angle sensor installed on the at least one vehicle of the plurality of vehicles, or
    disconnected or impaired the operation of a radar or lidar installed on the at least one vehicle of the plurality of vehicles.

10. The system of claim 1, wherein the processor is further configured to:
    receive, via the wireless transceiver from a vehicle of the plurality of vehicles, a suspected tampering event triggered in response to one or more vehicle sensor signals indicating possible tampering; and
    receive, via the wireless transceiver from the vehicle, additional data collected by the vehicle in response to the triggering of the suspected tampering event.

11. A method for determining driver tampering of vehicle information systems, the method comprising:
    receiving, by a wireless transceiver of a fleet management server, driver and vehicle information from a plurality of vehicles relating to a plurality of drivers' computing, by the fleet management server based on the received driver and vehicle information, occurrence rates for predetermined vehicle events and predetermined vehicle error codes that are associated with possible vehicle tampering;

comparing, by the fleet management server based on the received driver and vehicle information, an occurrence rate for the predetermined vehicle events and predetermined vehicle error codes of a first driver to occurrence rates for the predetermined vehicle events and predetermined vehicle error codes of one or more of the other plurality of drivers;

determining, by the fleet management server based on a result of the occurrence rate comparison, a tampering indicator for the first driver; and outputting, by the fleet management server to a user of the fleet management server, a confidence level that the first driver has tampered with at least one information component of at least one vehicle of the plurality of vehicles based at least in part on the tampering indicator.

12. The method of claim 11, wherein the driver and vehicle information comprises braking event data, curve speed event data, lane departure warning event data, lane departure event data, loss of video tracking event data, lane departure warning system disabled event data, distance alert event data, forward collision warning event data, collision mitigation braking event data, and potential tampering event data.

13. The method of claim 11, wherein the occurrence rate for predetermined vehicle events corresponds to a ratio of a detected number of occurrences of the predetermined vehicle events to a total distance traveled over a defined period of time, and wherein the occurrence rate for the predetermined vehicle error codes corresponds to a ratio of a detected number of occurrences of the predetermined vehicle error codes to the total distance traveled over the defined period of time.

14. The method of claim 11, wherein determining the tampering indicator for the first driver comprises determining if the first driver satisfies one or more of:

(A) having driven one or more of the plurality of vehicles for which driver tampering is suspected during a defined period of time, (B) having a high ratio of a number of vehicles driven by the first driver in which a predetermined vehicle event and/or predetermined vehicle error code occurs during the defined period of time to a total number of the plurality of vehicles driven by the first driver, (C) having, for one or more of the plurality of vehicles driven by the first driver, a low ratio of the plurality of drivers who experience the predetermined vehicle event and/or predetermined vehicle error code to a number of the plurality of drivers who do not experience any predetermined vehicle event and/or predetermined vehicle error code during the defined period of time.

15. The method of claim 14, wherein driver tampering is suspected for a vehicle, of the plurality of vehicles, when the vehicle reports at least one of the predetermined vehicle events and/or at least one of the predetermined vehicle error codes.

16. The method of claim 14, wherein the confidence level is based, at least in part, on the first driver satisfying one or more of (A), (B) and (C), wherein the confidence level increases as each additional one of (A), (B) and (C) is satisfied by the first driver.

17. The method of claim 16, wherein the confidence level further increases as:
the number of vehicles in (A) increases
the ratio in (B) increases, and
the ratio in (C) decreases.

18. The method of claim 14, wherein the information component comprises one of a vehicle camera, a vehicle speaker, a lane departure warning disable switch, a steering angle sensor, a lidar and a radar.

19. The method of claim 14, wherein the confidence level corresponds to a probability that the first driver has:
disconnected or impaired the operation of a camera installed on the at least one vehicle of the plurality of vehicles, disconnected or shorted a speaker installed on the at least one vehicle of the plurality of vehicles,
disabled a lane departure warning disable switch installed on the at least one vehicle of the plurality of vehicles,
disconnected or disabled a steering angle sensor installed on the at least one vehicle of the plurality of vehicles, or
disconnected or impaired the operation of a radar or lidar installed on the at least one vehicle of the plurality of vehicles.

20. The method of claim 11, further comprising:
receiving, by the wireless transceiver from a vehicle of the plurality of vehicles, a suspected tampering event triggered in response to one or more vehicle sensor signals indicating possible tampering; and
receiving, via the wireless transceiver from the vehicle, additional data collected by the vehicle in response to the triggering of the suspected tampering event.

* * * * *